(12) United States Patent
Tolbert et al.

(10) Patent No.: US 12,218,344 B2
(45) Date of Patent: Feb. 4, 2025

(54) NANOPOROUS LITHIUM VANADIUM FLUOROPHOSPHATE MATERIALS AND CATHODES FOR FAST CHARGING LI-ION BATTERIES

(71) Applicant: THE REGENTS OF THE UNIVERSITY OF CALIFORNIA, Oakland, CA (US)

(72) Inventors: Sarah H. Tolbert, Encino, CA (US); Terri C. Lin, Fremont, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 518 days.

(21) Appl. No.: 17/568,898

(22) Filed: Jan. 5, 2022

(65) Prior Publication Data
US 2022/0209224 A1  Jun. 30, 2022

Related U.S. Application Data

(63) Continuation of application No. PCT/US2020/042394, filed on Jul. 16, 2020.

(60) Provisional application No. 62/875,095, filed on Jul. 17, 2019.

(51) Int. Cl.
*H01M 4/36* (2006.01)
*H01M 4/58* (2010.01)
*H01M 4/62* (2006.01)
*H01M 10/0525* (2010.01)
*H01M 4/02* (2006.01)

(52) U.S. Cl.
CPC ........ *H01M 4/366* (2013.01); *H01M 4/5825* (2013.01); *H01M 4/625* (2013.01); *H01M 10/0525* (2013.01); *H01M 2004/021* (2013.01); *H01M 2004/028* (2013.01)

(58) Field of Classification Search
CPC ....... H01M 10/0525; H01M 2004/021; H01M 2004/028; H01M 4/136; H01M 4/366; H01M 4/5825; H01M 4/625; Y02E 60/10
See application file for complete search history.

(56) References Cited

U.S. PATENT DOCUMENTS

2012/0213920 A1  8/2012  Yanagita
2015/0333376 A1  11/2015  Gaben

FOREIGN PATENT DOCUMENTS

CN  105702927 A  * 6/2016  ........ H01M 10/0525
WO  2021011811  1/2021

OTHER PUBLICATIONS

Machine translation CN105702927A (Year: 2016).*
ISA/US, United States Patent and Trademark Office (USPTO), International Search Report and Written Opinion issued Dec. 3, 2020, related PCT international application No. PCT/US2020/042394, pp. 1-13, with claims searched, pp. 13-18.
(Continued)

*Primary Examiner* — Victoria H Lynch
(74) *Attorney, Agent, or Firm* — O'BANION & RITCHEY LLP; John P. O'Banion

(57) ABSTRACT

Nanoporous carbon coated lithium vanadium fluorophosphate materials and cathodes for fast charging li-ion batteries are described. Formation of the materials using polymer-templating is also described.

12 Claims, 20 Drawing Sheets

(56) References Cited

OTHER PUBLICATIONS

Figure 1:
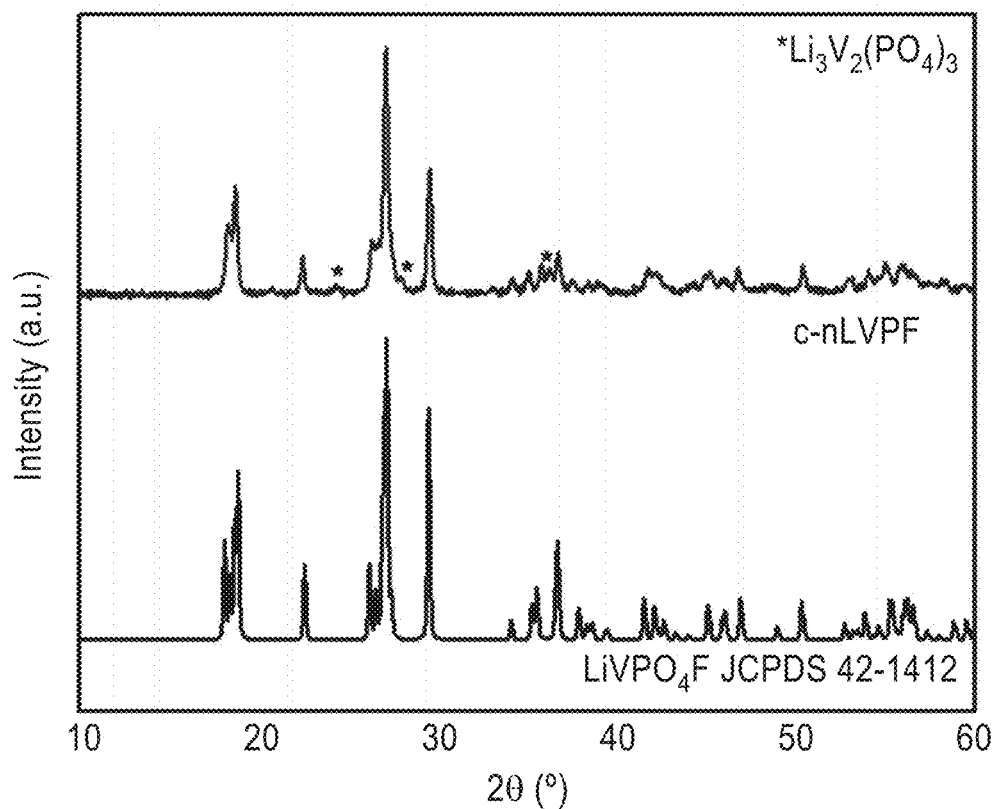

Zhang, Bao et al., "A novel lithium vanadium fluorophosphate nanosheet with uniform carbon coating as a cathode material for lithium-ion batteries", Journal of Power Sources, 264, 2014, pp. 123-127.
Oh, Dahyun, et al., "Biotemplating pores with size and shape diversity for Li-oxygen Battery Cathodes", Scientific Reports, 7:45919 DOI:10.1038/srep45919, Apr. 4, 2017, pp. 1-12.
Martin, Jaime et al., "Ordered arrays of polymeric nanopores by using inverse nanostructured PTFE surfaces" Nanotechnology, 23 385305, Sep. 2012, pp. 1-11, http://iopscience.iop.org/0957-4484/23/38/385305
Canadian Intellectual Property Office, office action issued Apr. 8, 2024, related Canadian patent application No. 3,145,312, pp. 1-5, with claims searched. pp. 6-7.
Japanese Patent Office (JPO), Office Action issued Jul. 16, 2024, related Japanese patent application No. JP 2022-501212, pp. 1-6, English-language translation, pp. 7-10, claims examined, pp. 6-13.
European Patent Office (EPO), Communication (Extended European Search Report) issued Jul. 5, 2024, related European patent application No. 20840469.9, pp. 1-6, with claims searched, pp. 7-10.
Zhang, Bao, et al., "A novel lithium vanadium fluorophosphate nanosheet with uniform carbon coating as a cathode material for lithium-ion batteries", Journal of Power Sources, vol. 264, 2014, pp. 123-127.
Kim, Minkyung, et al., "Fast-Rate Capable Electrode Material with Higher Energy Density than LifePO4: 4.2V LiVPO4F Synthesized by Scalable Single-Step Solid-State Reaction", Advance Science, vol. 3, Issue 3, Jan. 18, 2017, pp. 1-21.

\* cited by examiner

NANOPOROUS LITHIUM VANADIUM FLUOROPHOSPHATE MATERIALS AND CATHODES FOR FAST CHARGING LI-ION BATTERIES

CROSS-REFERENCE TO RELATED APPLICATIONS

This application claims priority to, and is a 35 U.S.C. § 111(a) continuation of, PCT international application number PCT/US2020/042394 filed on Jul. 16, 2020, incorporated herein by reference in its entirety, which claims priority to, and the benefit of, U.S. provisional patent application Ser. No. 62/875,095 filed on Jul. 17, 2019, incorporated herein by reference in its entirety. Priority is claimed to each of the foregoing applications.

The above-referenced PCT international application was published as PCT International Publication No. WO 2021/011811 A1 on Jan. 21, 2021, which publication is incorporated herein by reference in its entirety.

STATEMENT REGARDING FEDERALLY SPONSORED RESEARCH OR DEVELOPMENT

This invention was made with government support under Grant DE-SC0014213, awarded by the U.S. Department of Energy. The government has certain rights in the invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to lithium vanadium fluorophosphate cathodes for li-ion batteries and more particularly to carbon coated nanoporous lithium vanadium fluorophosphate materials formed using sol-gel polymer-templating.

2. Background Discussion

As technology continues to evolve, the need for energy storage devices with both high energy and power densities also grows. Nanostructured high-voltage cathodes are of increasing interest to accomplish the first of those goals. To push the operating voltage window above the 3.6 V typical of lithium cobalt oxide (LCO)|graphite cells, spinel oxides, Li(M, M', M")$O_4$, and layer oxides, Li(M, M', M")$O_2$ with M=Co, Ni, Mn, Al, have been the systems of choice due to their high operating potential (>4.3V), high theoretical capacity, good electronic conductivity and decent rate capabilities. Unfortunately, these layered and spinel oxides suffer from low thermal stability due to the formation of metastable phases in the charge state that can readily decompose and release $O_2$. In addition, their sensitivity to moisture makes them hard to process and can significantly shorten the lifetime as impurities such as LiOH and $Li_2CO_3$ can form on the surface. Phosphate based polyanionic cathodes on the other hand, have demonstrated much better thermal stability due to the more thermodynamically stable P—O bonds. These P—O bonds are largely covalent in nature and are stronger than polar oxygen-metal bonds in transition metal oxides. Though many polyanion cathodes have been explored, such as $LiFePO_4$, most of them have low redox potentials because they rely on polyanionic groups with low electronegativity such as $(PO_4)^{3-}$ and $(SiO_4)$.

To overcome these issues, alternative polyanionic cathodes with higher potentials and higher capacity such as favorite-structured fluorophosphates, $LiMPO_4F$ and $Li_2MPO_4F$ (M=Fe, Mn, Co, Ti, and V), have been explored. By taking advantage of inductive effects, the introduction of fluorine into these structures induces a more ionic metal-ligand bond and therefore increases the redox potential as the energy of the antibonding orbital level decreases. Among the fluorine containing polyanions, $LiVPO_4F$ (LVPF) is the most attractive cathode because it has a reasonable theoretical capacity of 156 mAh/g and a high redox potential of 4.28 V vs Li/Li$^+$, a value which is the highest redox potential among $V^{3+}/V^{4+}$ redox couples in polyanion compounds. In addition, LVPF shows a relatively high bulk ionic conductivity of about 8·10$^{-7}$ S cm$^{-1}$ due to quasi 1D diffusion paths along the [111] direction and has excellent thermal and structural stability.

Although LVPF has been known for some time, only a few researchers have focused on improving its rate capabilities, because most studies have focused on developing simpler synthetic routes for pure phase LVPF. Synthesis of LVPF can be challenging because LVPF can easily turn into $LiVPO_4O$ and $Li_3V_2(PO_4)_3$ if oxygen is present and if a fluorine rich environment is not created during the synthesis. Until recently, most LVPF was obtained from a two-step synthesis based on carbo-thermal reduction (CTR). This method relies on using large amount of carbon to reduce $V^{5+}$ precursors to $V^{3+}$ to produce an intermediate phase of $VPO_4$/C. LiF is then added to the intermediate, followed by a second heat treatment, to make the final LVPF product. Though this two-step synthesis has been adapted by many groups, it is difficult to optimize because the amount of carbon in $VPO_4$/C needs to be precisely controlled as any deviation can lead to impurities. In addition, the transfer process from the first annealing step to the second can introduce oxygen into the system.

Among all LVPF syntheses, only a few publications have been reported on nanoscale LVP. Nanostructures are favorable because the rate capabilities of most battery materials can be significantly improved when the ion diffusion path length is shortened, and in some cases when the first order phase transitions are suppressed. Under these conditions, traditional battery materials can be converted to nanoporous pseudocapacitors with impressive rate capabilities. Unfortunately, the performance of most reported nanoscale LVPF materials is not impressive, possibly due to agglomeration of the LVPF nanoparticles, compounding the established problem of poor conductivity in nanoparticle based materials.

Fast charging cathodes with high operating voltages are critical to the development of high energy and power density lithium-ion batteries. One route to fast charging battery materials is through the formation of nanoporous networks, but these methods are often limited by the high calcination temperatures required for synthesis.

BRIEF SUMMARY

This disclosure generally describes nanoporous lithium vanadium fluorophosphate (LiVPO$_4$F) cathodes for fast charging li-ion batteries, and more particularly sol-gel polymer-templated nanoporous LiVPO$_4$F fast charging cathodes.

By way of example, and not of limitation, we describe the synthesis of carbon coated nanoporous LiVPO$_4$F with excellent rate capabilities that can be stably cycled up to 4.6V in standard LiPF$_6$ electrolytes. During charge and discharge at 30 C, 110 mAh/g (70% of theoretical capacity) was obtained, and only 9% of capacity was lost after 2000 cycles at 20 C. These materials also showed excellent stability, with little self-discharge, an open circuit voltage of 4.2 V, and a discharge capacity of 139 mAh/g obtained after holding for 12 hours. Rate capabilities were further demonstrated in a proof-of-concept full cell made with a nanostructured Nb$_2$O$_5$. These devices were able to deliver 200 mAh/g at 1 C and 100 mAh/g at 30 C. Finally, operando X-ray diffraction and electrochemical kinetics were further used to provide insight into the nature of fast charging in these materials.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1: X-ray diffraction patterns of the c-nLVPF (upper trace) and reference JCPDS 42-1412 (lower trace). The only impurities observed correspond to a small amount of Li$_3$V$_2$(PO$_4$)$_3$, indicated with asterisks next to the upper trace.

Figure 2A:
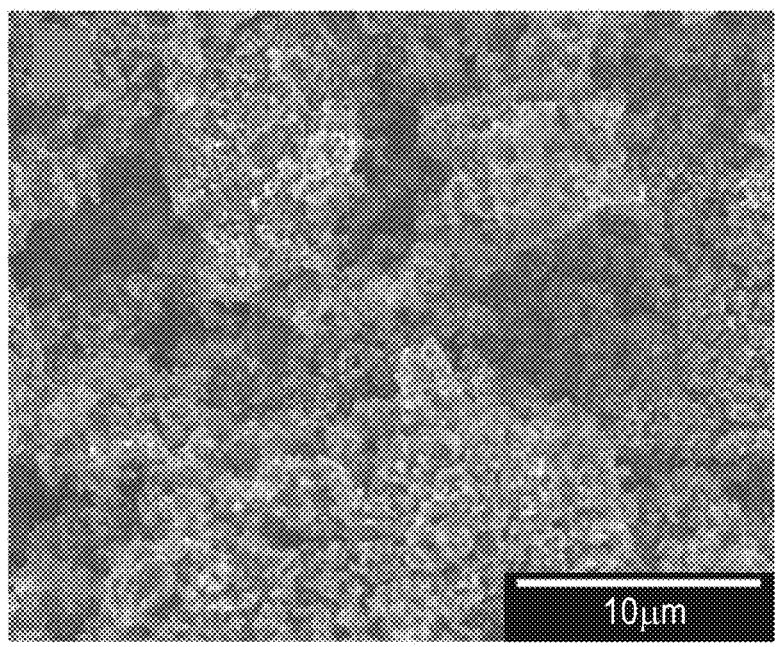
Figure 2B:
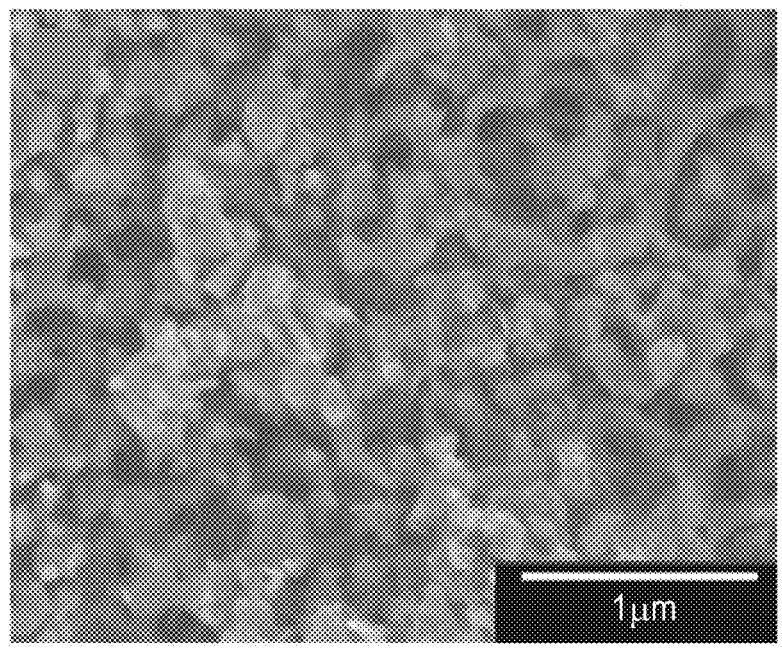
Figure 2C:
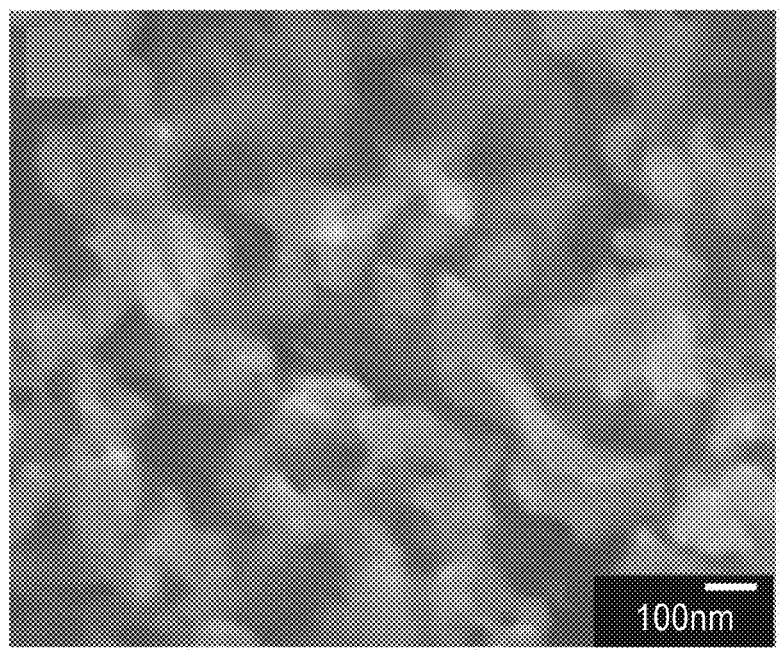

FIG. 2A through FIG. 2C: SEM images of the as synthesized nanoporous c-nLVPF powder made by sol-gel polymer templating methods. The uniformity in the porous structure results from the polymer template and can be seen at both low and high magnifications.

Figure 3A:
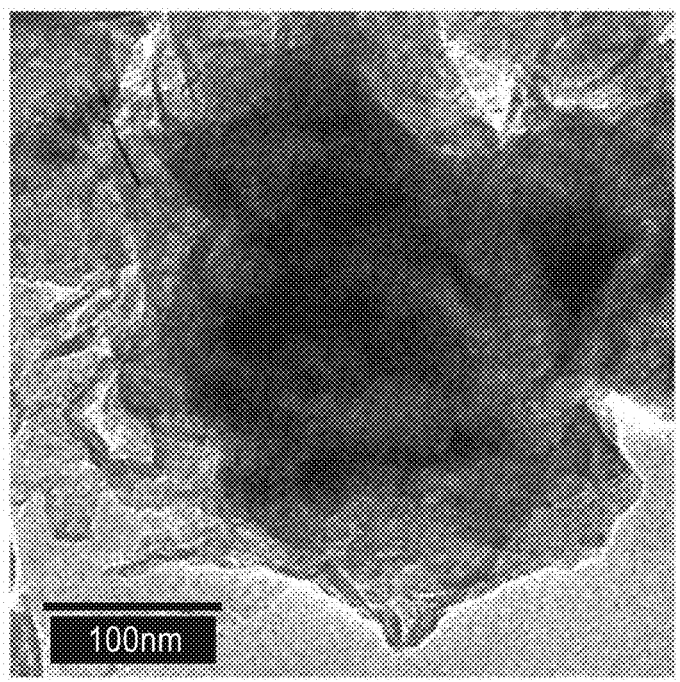
Figure 3B:
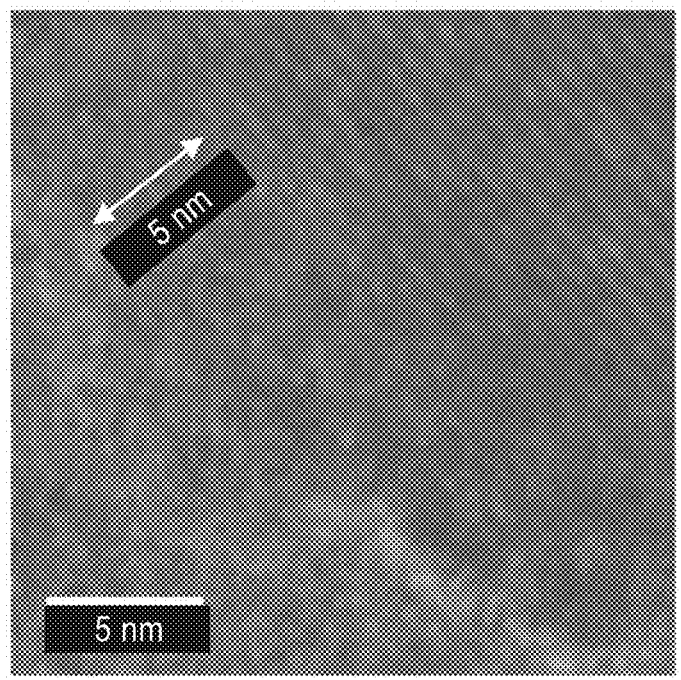

FIGS. 3A and 3B: TEM images of the c-nLVPF. The carbon coating wraps around the particle and is approximately 5 nm thick.

Figure 4:
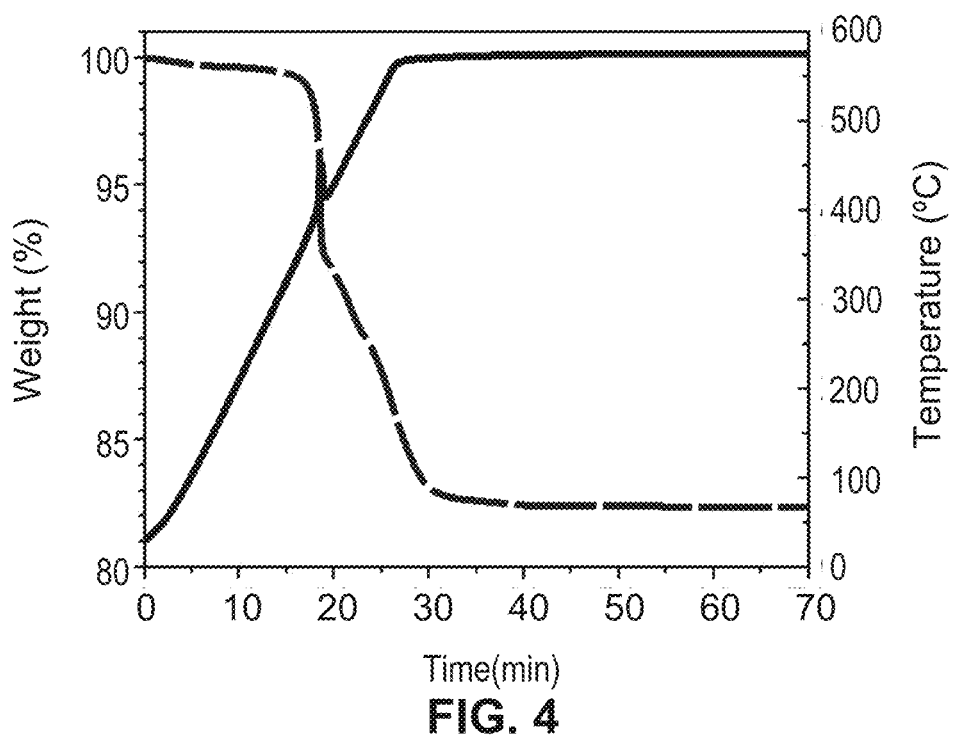

FIG. 4: TGA of c-nLVPF from room temperature to 550° C. A mass loss was observed from 375-450° C. that was attributed to the carbon content.

Figure 5:
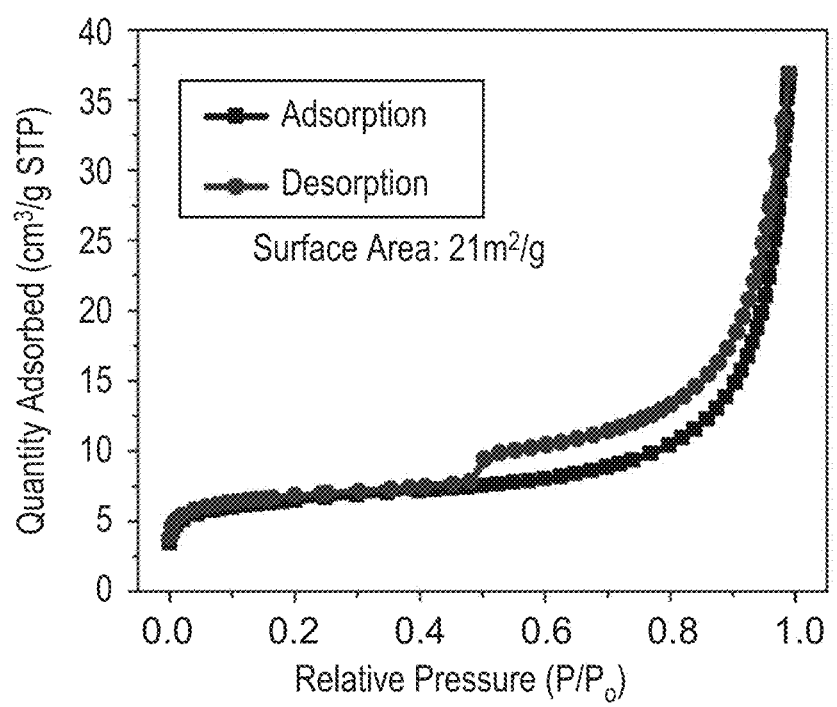

FIG. 5: Isotherm of c-nLVPF obtained from N2 porosimetry. The surface area calculated from the BET model is 21 m2/g.

Figure 6:
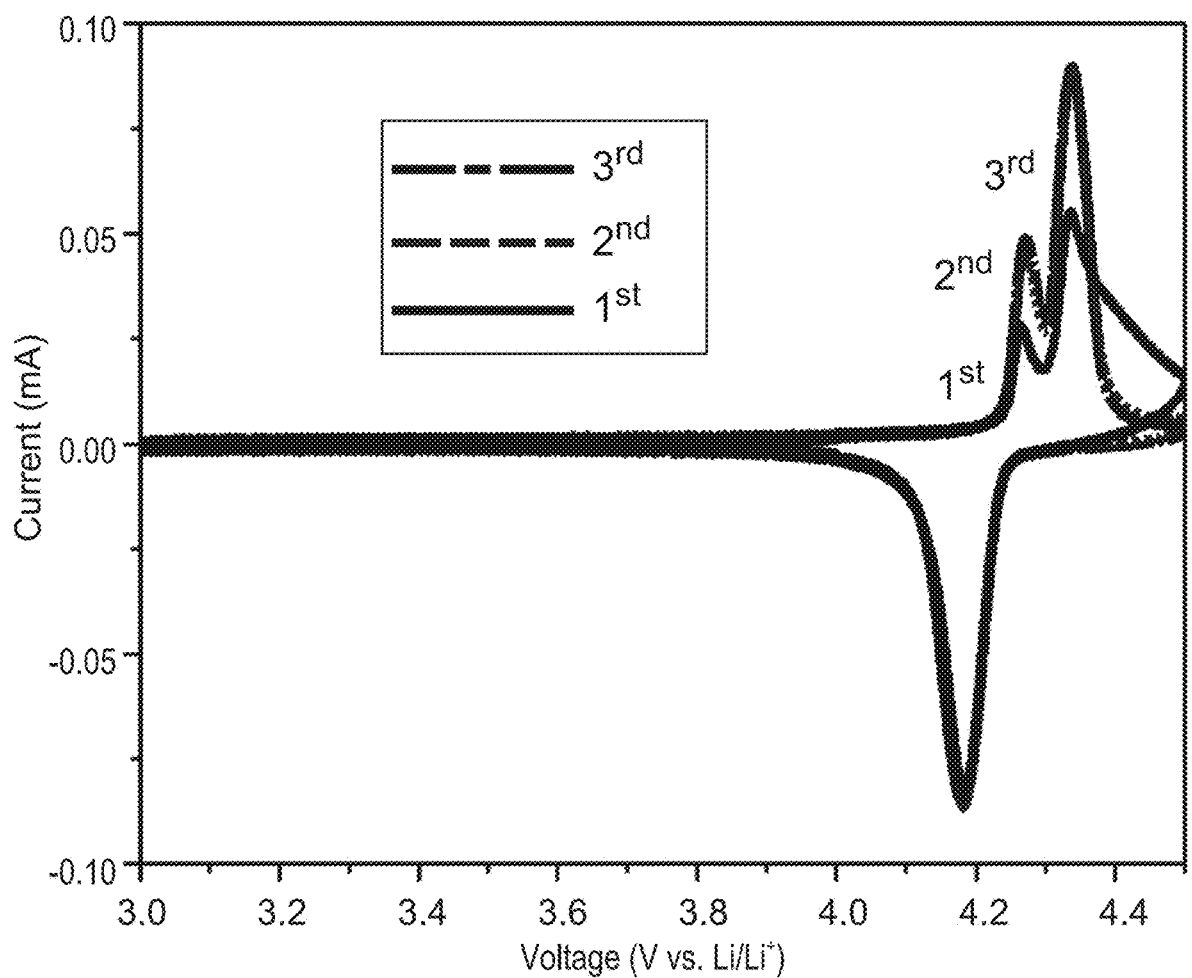

FIG. 6: CV curves for c-nLVPF collected at 0.1 mV/s. The redox peaks indicate the electrochemical process described in Equation (6).

Figure 7:
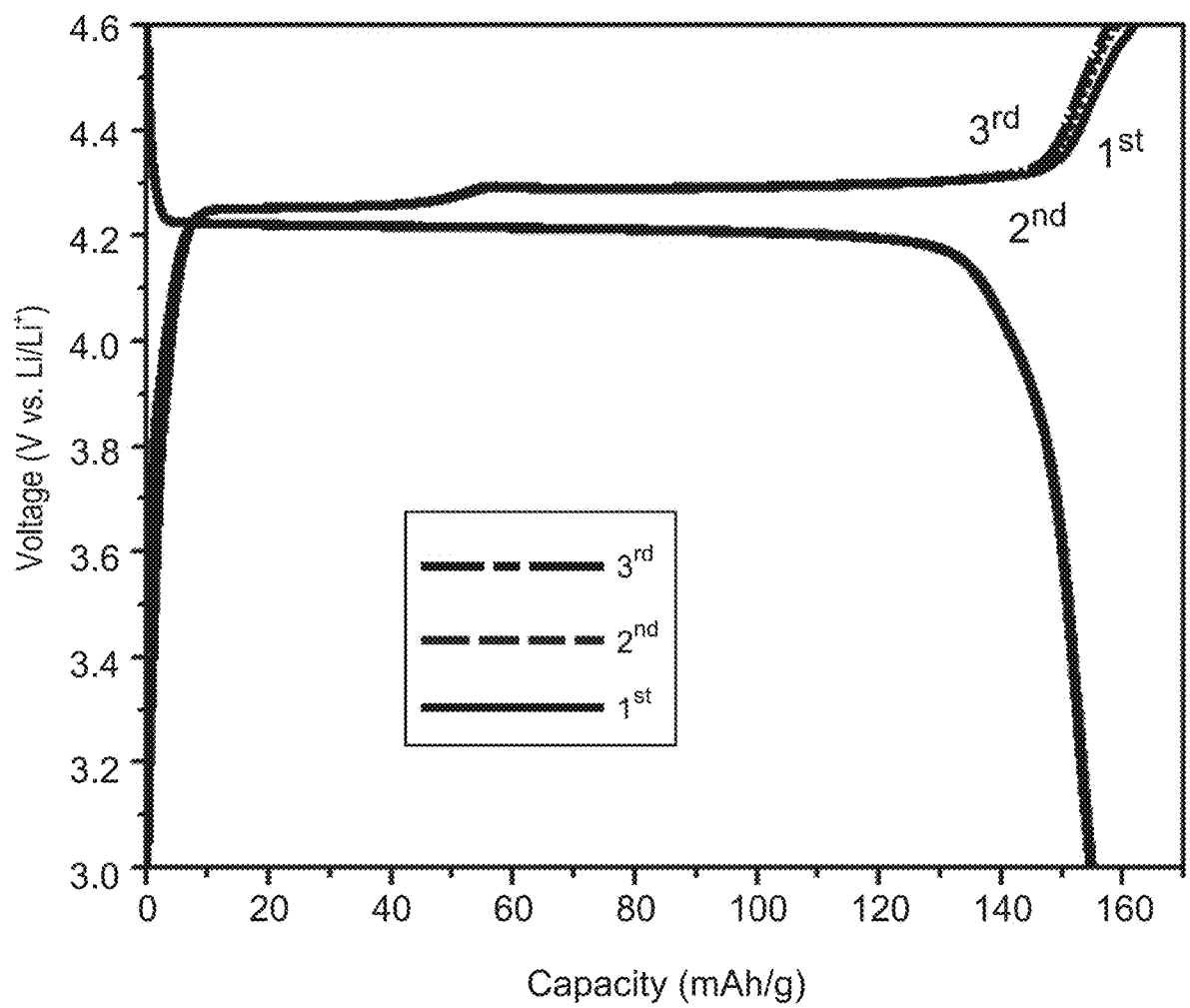

FIG. 7: Galvanostatic charge and discharge profiles for the first three cycles of at 1 C.

Figure 8:
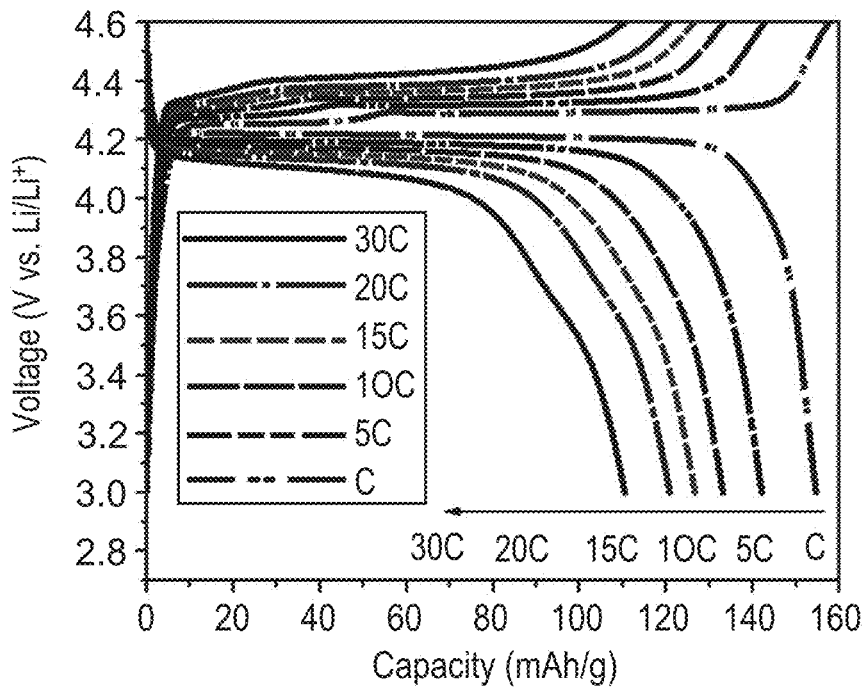

FIG. 8: Charge and discharge voltage profiles of c-nLVPF at various rates (charging and discharging are done at the same rate for every cycle).

Figure 9:
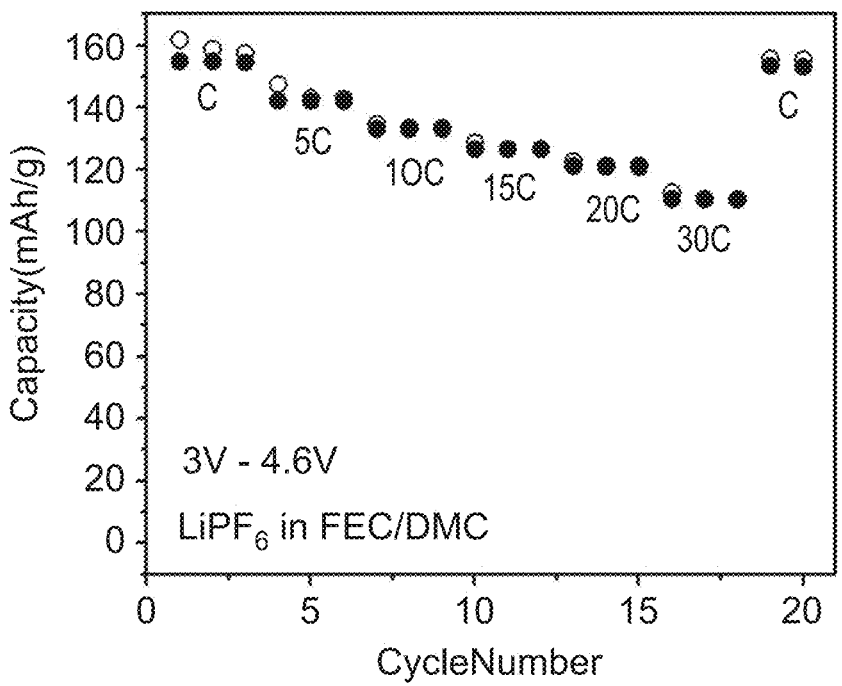

FIG. 9: Capability and Coulomb efficiency at various rates.

Figure 10:
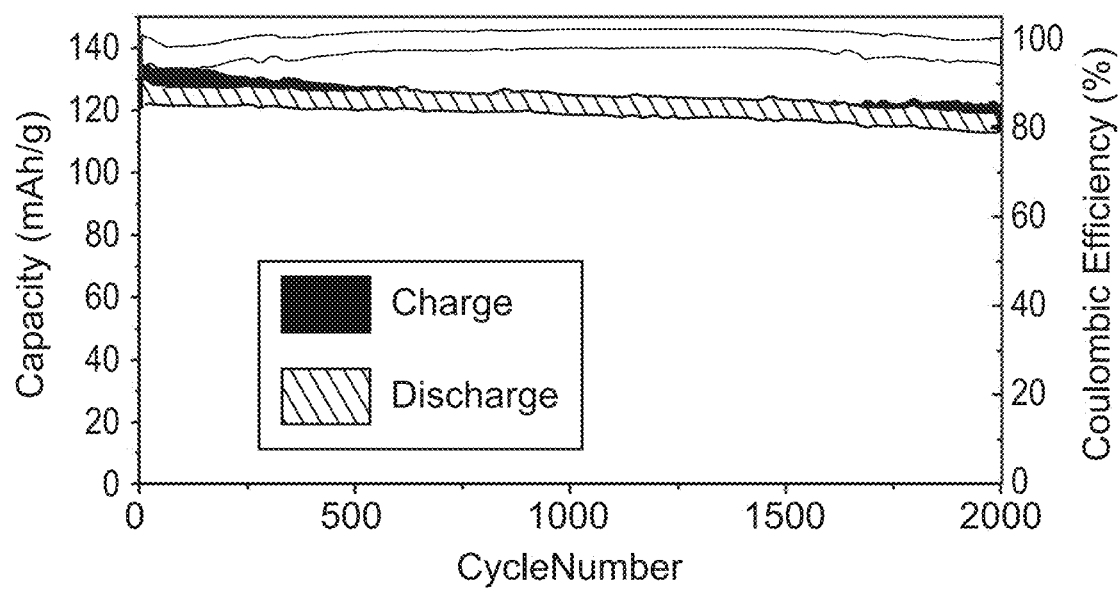

FIG. 10: Capacity retention at 20 C charge and discharge showing good stability over 2000 cycles.

Figure 11:
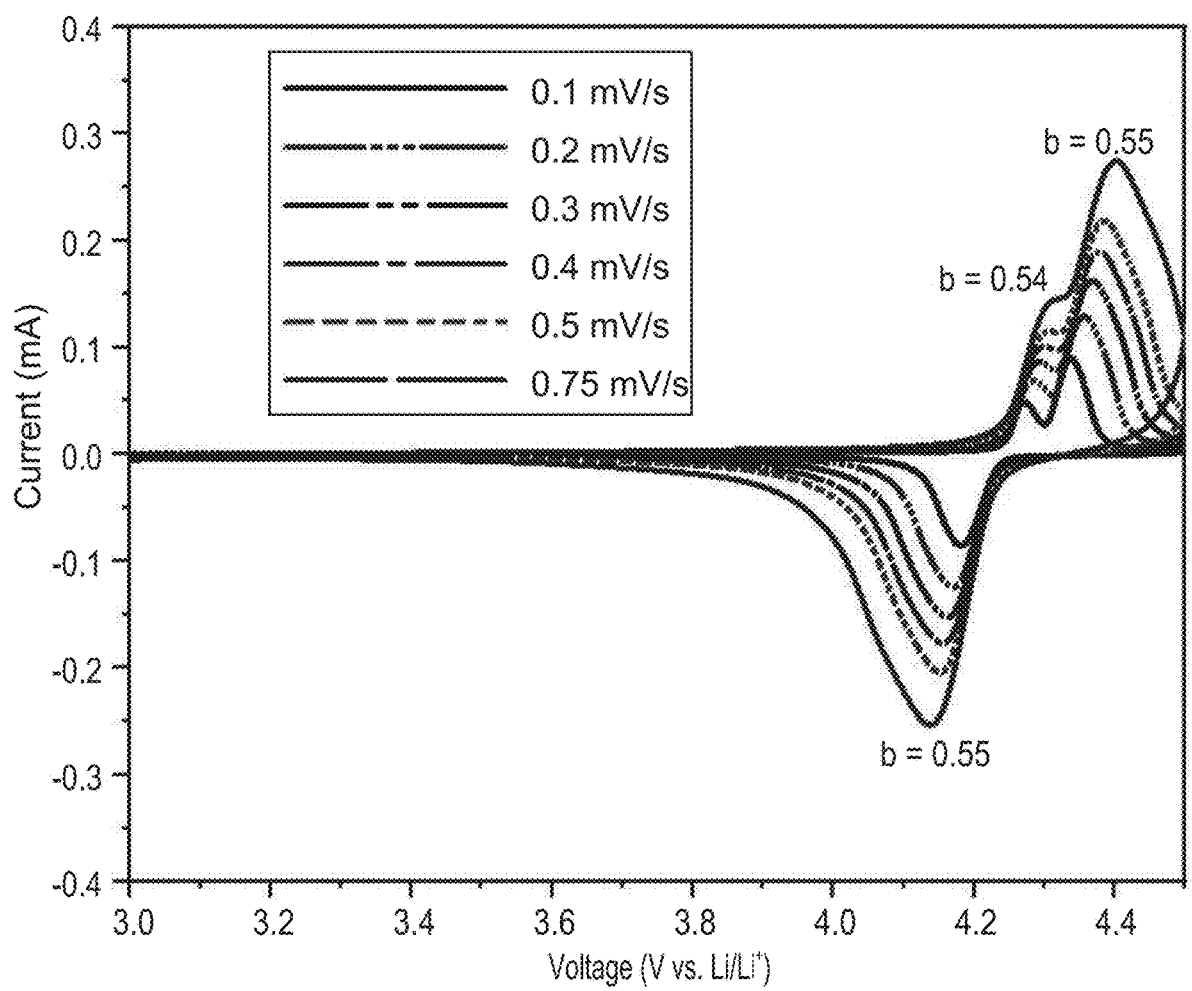

FIG. 11: Cyclic voltammograms of the c-nLVPF at 0.1 mV/s, 0.2 mV/s, 0.3 mV/s, 0.4 mV/s 0.5 mV/s and 0.75 mV/s with calculated b-values. The system is mostly diffusion-limited with b values close to 0.5.

Figure 12:
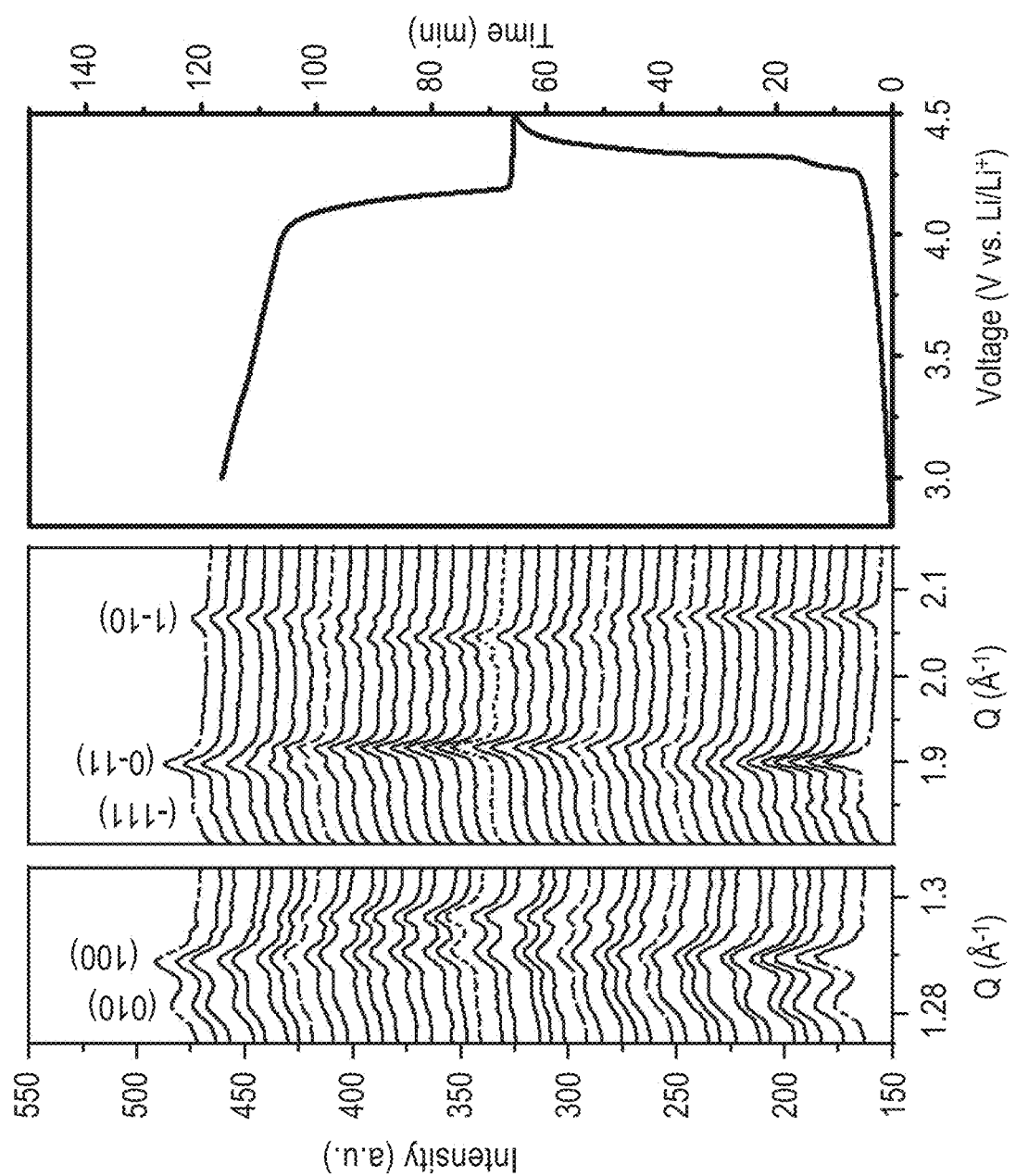

FIG. 12: Operando X-ray diffraction for c-nLVPF. First-order phase transitions can be observed as peak shifts to position that corresponds to the VPO$_4$F phase.

Figure 13:
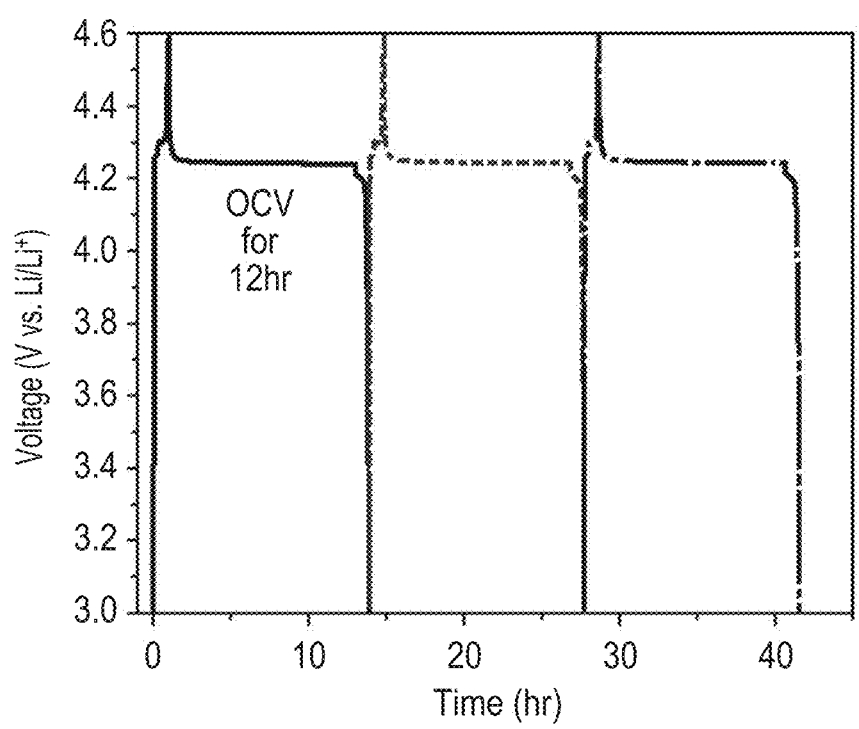
Figure 14:
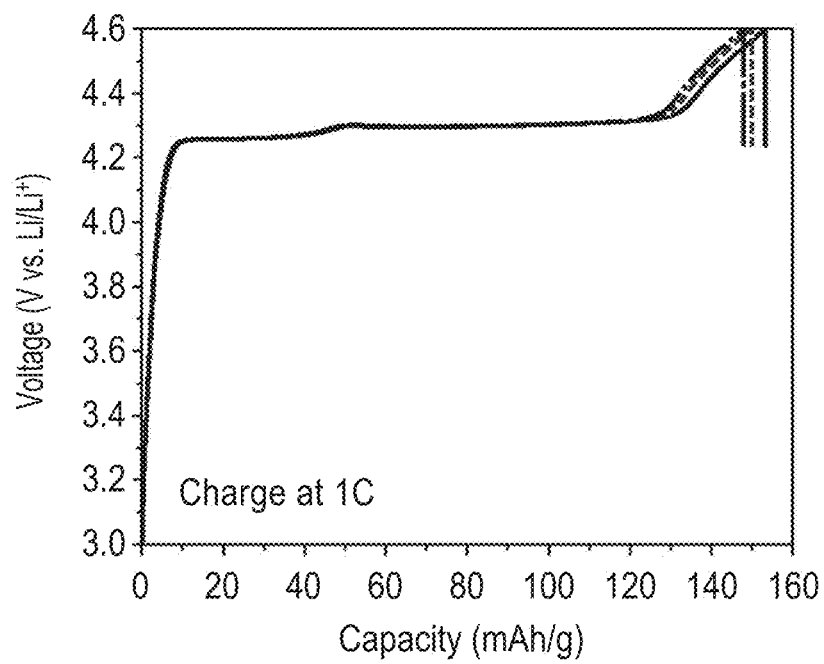
Figure 15:
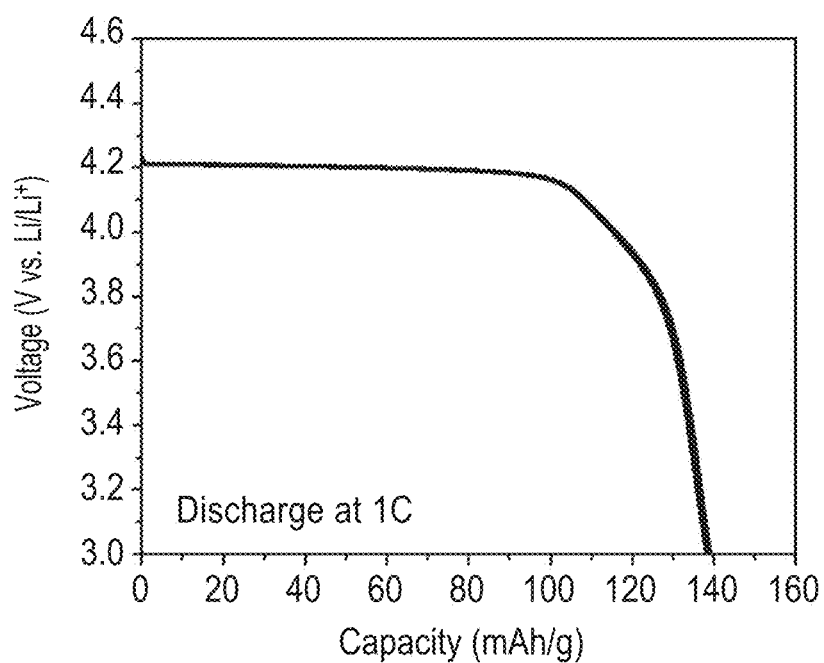

FIG. 13 through FIG. 15: Self-discharge behavior of c-nLVPF. FIG. 13 shows voltage curves of each cycle (charge, rest for 12 hr, then discharge). FIG. 14 shows the three charge curves plotted together. FIG. 15 shows the three discharge curves obtained after resting.

Figure 16:
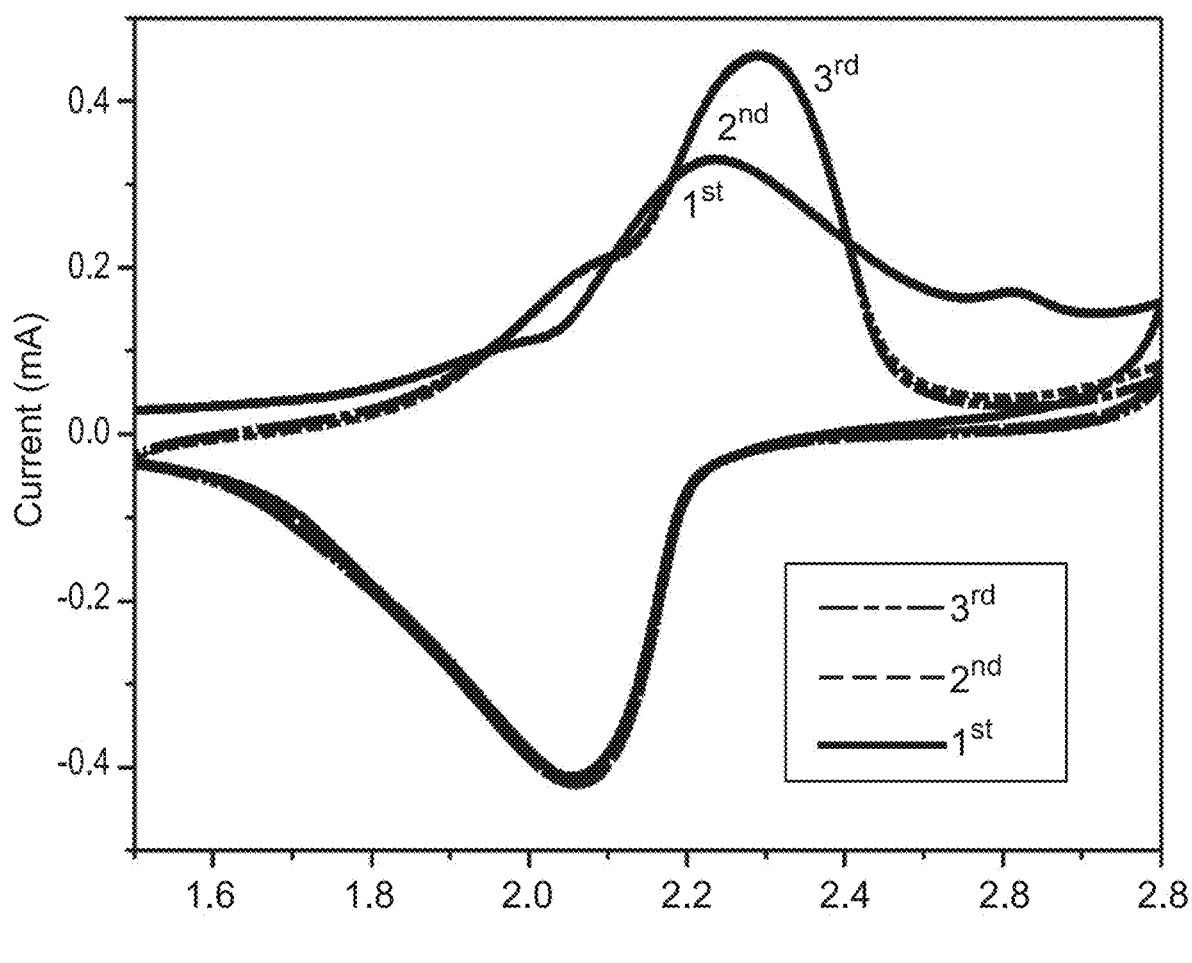

FIG. 16: CV curves of the full cell device (Nb$_2$O$_5$|c-nLVPF).

Figure 17:
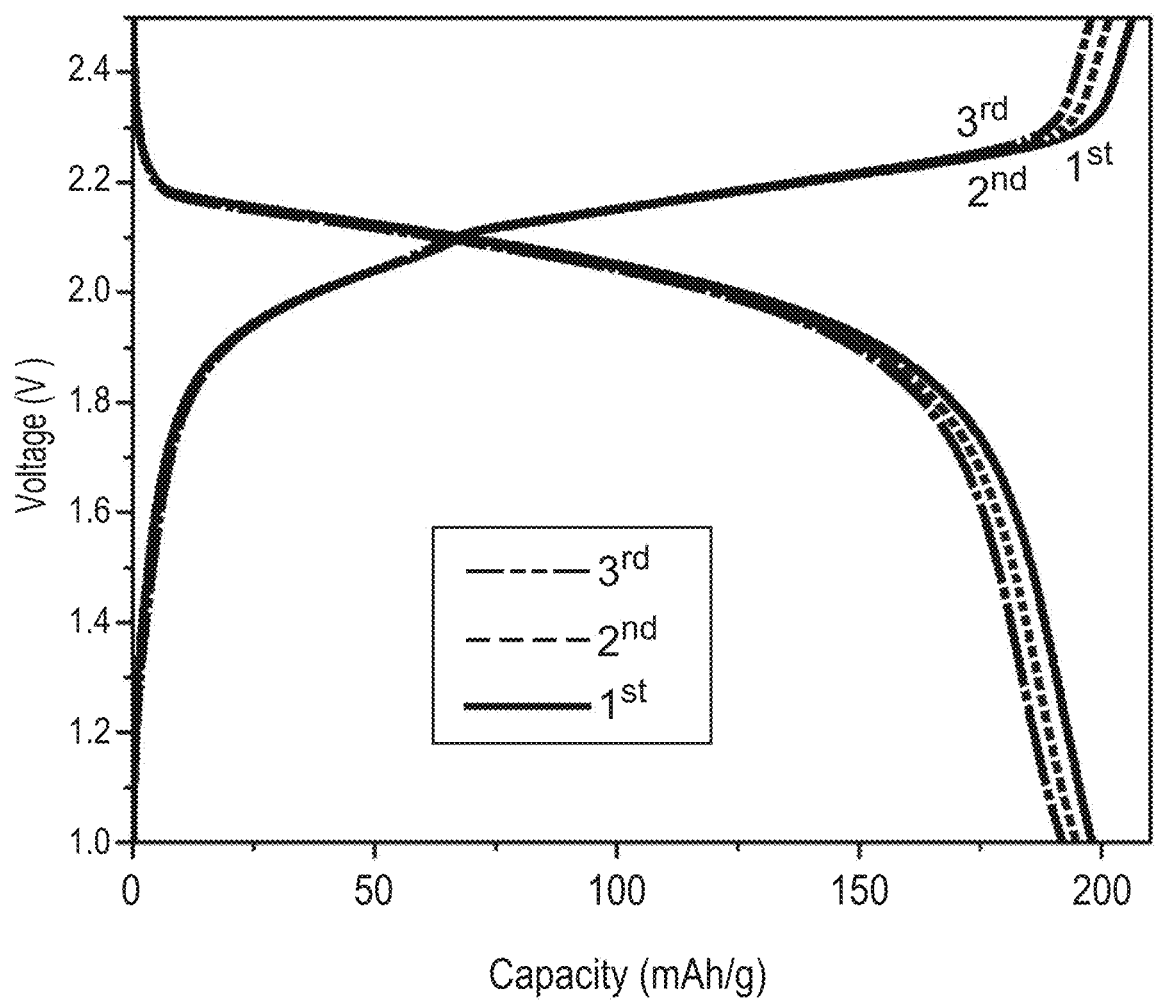

FIG. 17: Charge and discharge profiles of the full cell device at 1 C.

Figure 18:
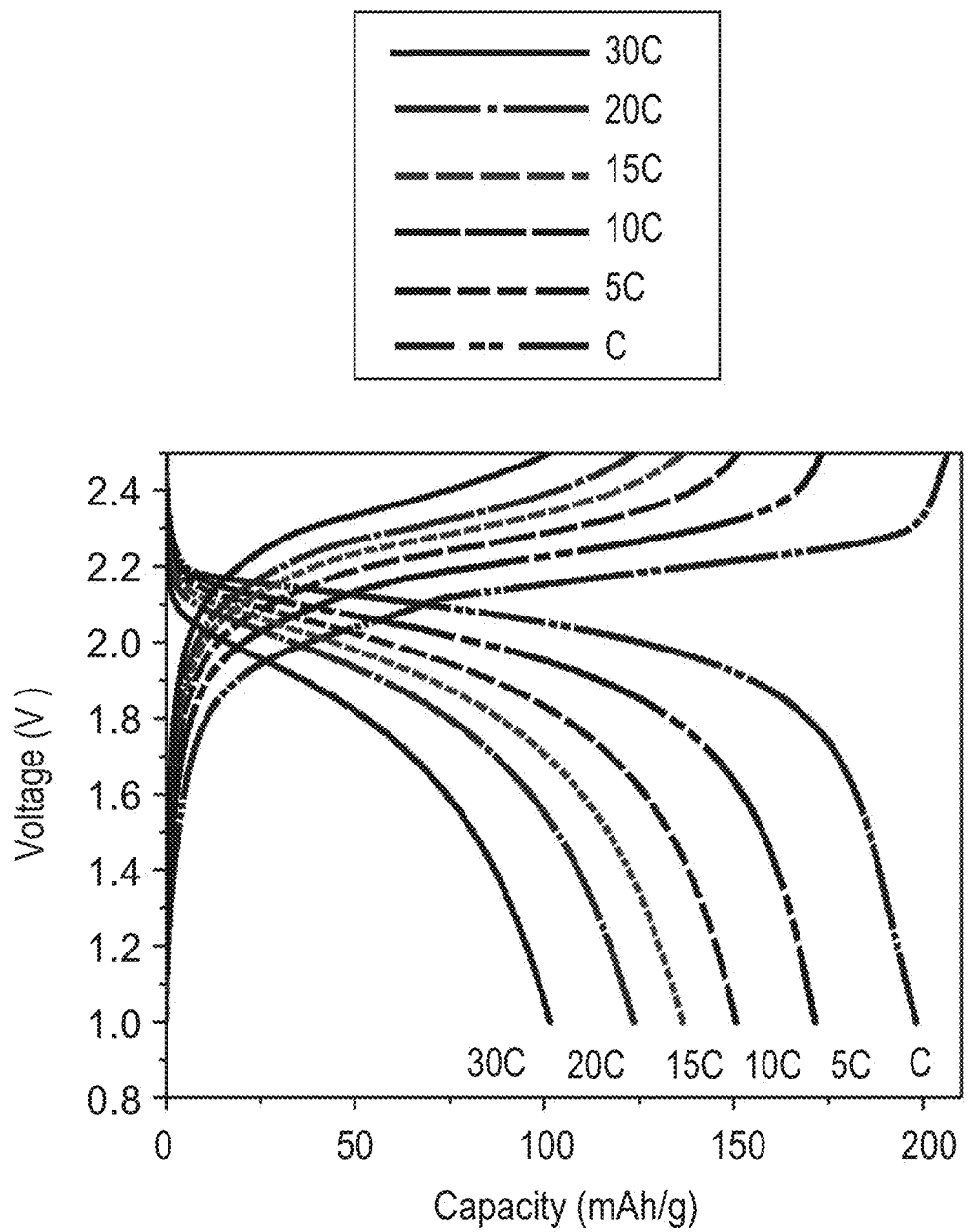

FIG. 18: Charge and discharge voltage profiles of the full cell device at various rates (charging and discharging are done at the same rate for each cycle). The capacity here is normalized by the weight of c-nLVPF only.

Figure 19:
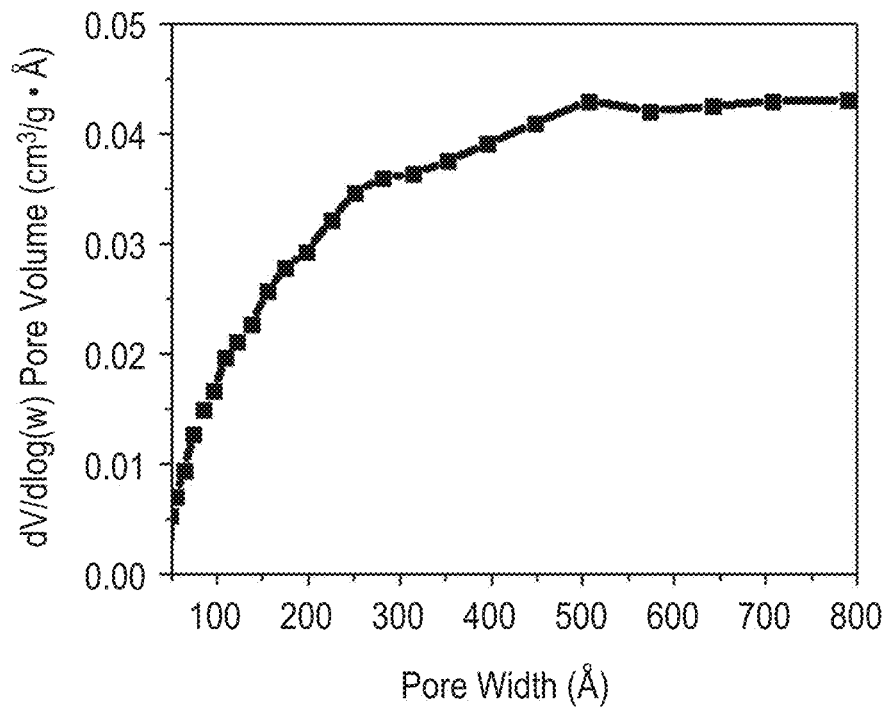
Figure 20:
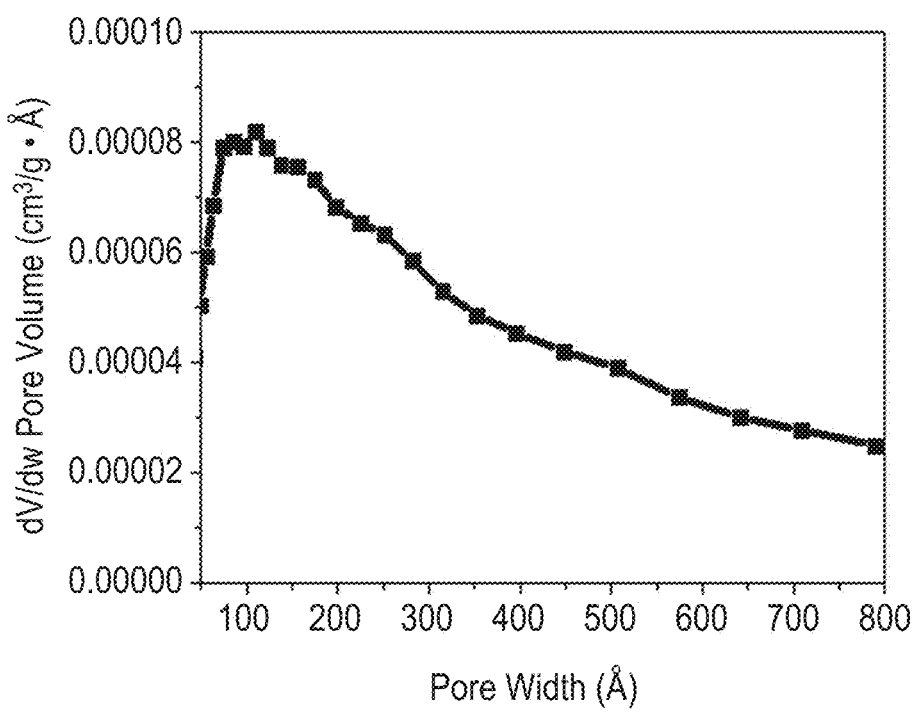

FIG. 19 and FIG. 20: The dV/d log(w) (volume-weighted) and dV/dw (number-weighted) pore size distribution, respectively, of c-nLVPF calculated from the Barrett-Joyner-Halenda region. Note that c-nLVPF has a large pore size distribution from 10-80 nm but consists of mostly 10-30 nm pores.

Figure 21:
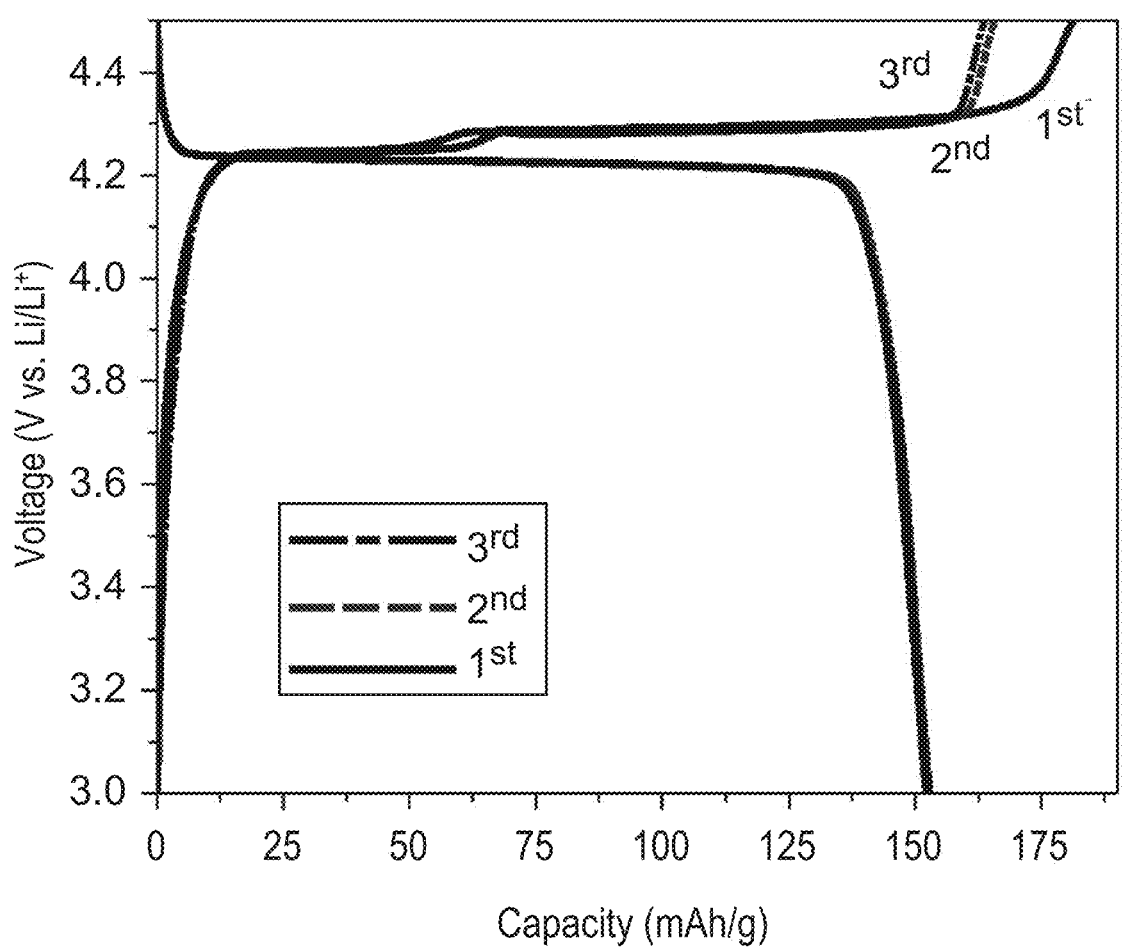

FIG. 21: The first three charge and discharge profiles of c-nLVPF in 1M LiClO$_4$ in PC at 1 C. Half-cell testing in 1M LiClO$_4$ in PC was cycled from 3-4.5V instead of 3-4.6V because conventional carbonate electrolytes are not stable beyond 4.6V voltage. They begin experiencing breakdown at 4.2V.

Figure 22:
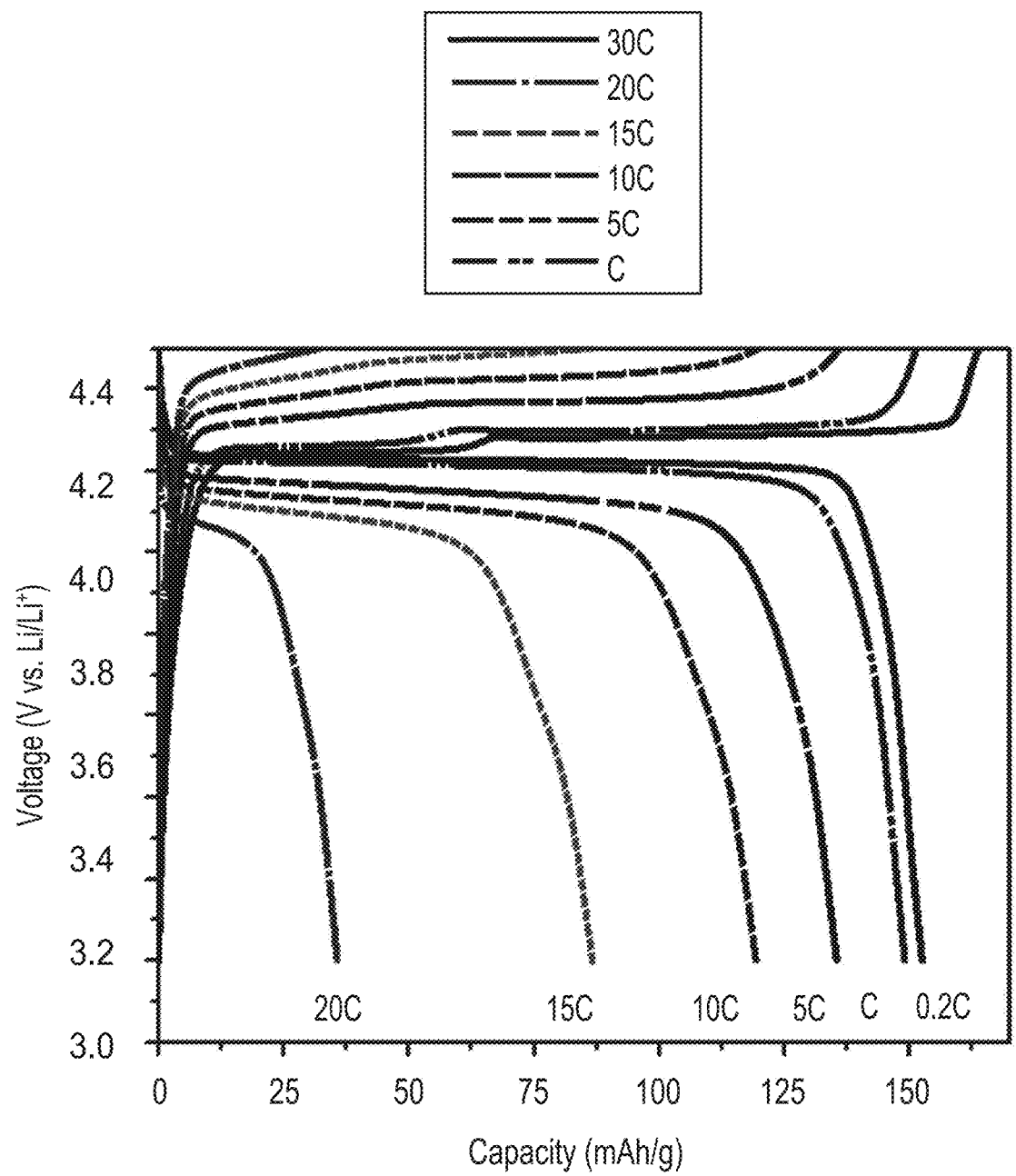

FIG. 22: Charge and discharge curves of c-nLVPF in 1M LiClO$_4$ in PC at 0.2 C, C, 5 C, 10 C, 15 C, and 20 C.

Figure 23:
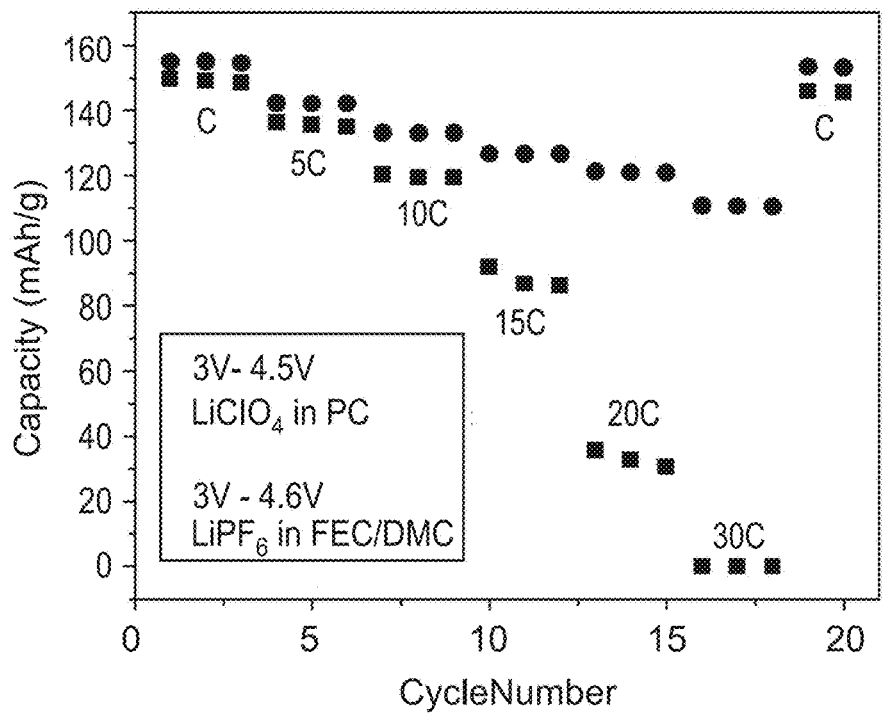

FIG. 23: Rate capability of c-nLVPF in two different electrolytes, 1M LiPF$_6$ in FEC/DMC (dots) and 1M LiClO$_4$ in PC (boxes). The discharge capacities are comparable at slow rate but at faster rates, c-nLVPF performs much better in 1M LiPF$_6$ FEC/DMC.

Figure 24:
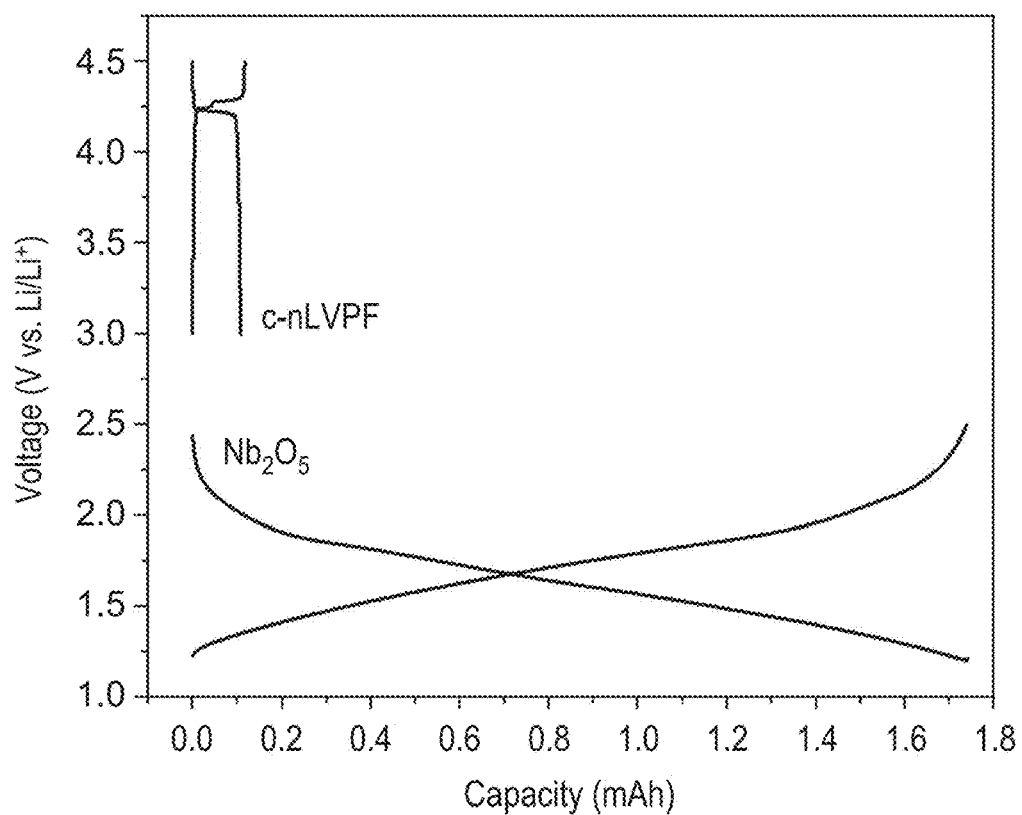

FIG. 24: Charge and discharge curves of c-nLVPF (upper traces) and Nb$_2$O$_5$ (lower traces) used in full cell testing. The area of the c-nLVPF and Nb2O5 electrodes are 0.7 cm2 and 1.26 cm2, respectively. These galvanostatic curves were obtained from half-cell testing in 1M LiClO$_4$ in PC at 1 C.

DETAILED DESCRIPTION

To realize fast kinetics in high voltage LVPF, one solution is to move from nanoparticles to nanoporous networks that are fully electrically interconnected. To accomplish this goal, we take advantage of a published one-step solid state synthesis of submicron LVPF particles with very good rate capabilities that starts with simple precursors (NH$_4$H$_2$PO$_4$, LiF, V$_2$O$_5$, and Teflon (Polytetrafluoroethylene, PTFE). See, Kim, M. et al., "Fast-rate capable electrode material with higher energy density than LiFePO$_4$: 4.2 V LiVPO$_4$F synthesized by scalable single-step solid state reaction", Adv. Sci. 3, 1500366 (2016). The PTFE creates both a fluorine rich and anoxic environment, since the carbon in PTFE can scavenge oxygen to make either CO or CO$_2$. Similar precursors could also be co-dissolved in solution to make micron scale LVPF with nanosize primary particles, and together, those advances served as the backdrop for the work presented here. By adapting similar precursors but applying them to a sol-gel polymer template method, nanoporous structures can be created. In one embodiment, we build on the approach of using PTFE as a fluorine source, but combine that with the use of PTFE as a colloidal template for porosity. Unfortunately, if only colloidal PTFE is used, ideal porosity and the correct crystal structure cannot be simultaneously obtained, but a combination of PTFE of PMMA colloids can be tuned to produce ideal porosity and the correct crystal structure.

In the discussion that follows, we present a carbon coated nanoporous LVPF (c-nLVPF) with exceptional rate capabilities up to 30 C and an extended operating voltage window up to 4.6 V. With a two minutes charge and discharge, 110 mAh/g were obtained. These c-nLVPF materials were made from a simple water based synthesis using both PTFE and PMMA colloids, which constitute the fluorine source, the oxygen scavenger, and the polymer template. Interestingly, electrochemical kinetics and operando X-ray diffraction reveal that charge storage in c-nLVPF remains dominantly diffusion controlled and that there is a phase transition during charge and discharge, confirming that energy storage in these materials remains battery-like and not pseudocapacitive, despite their impressive rate capabilities. When paired with pseudocapacitive anodes, however, fast charging full cells can be realized.

1. Results and Discussion 1.1 Materials and Characterization

Polymer templating of sol-gel derived materials provides a facile synthetic route to many nanoporous materials. A typical synthesis consists two major components: inorganic precursors and structural directing agents such as preformed colloids or surfactants or block copolymers that will readily form micelles in solution. When well-suspended in solution, structural directing agents co-assemble with the metal salts as the inorganic precursor undergo hydrolysis and condensation reaction to form a gel network around the colloids or micelles. The gel can then be dried and thermally annealed to crystallize the inorganic framework and decompose the polymer template, leaving the nanoporous network behind.

To make c-nLVPF powder, inorganic precursors ($V_2O_5$, $NH_4VO_3$, and LiF) and a reducing agent (oxalic acid, $H_2C_2O_4$) were dissolved in water to form a sapphire blue sol. With its bidendate nature, oxalic acid is responsible for reducing $V^{5+}$ to $V^{4+}$ to make vanadyl oxalate, which further reacts with other metal salts. Furthermore, oxalic acid is the precursor for the carbon coating as it decomposes. This whole process is described below in Equations (1) through (3):

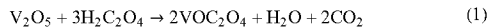
$$V_2O_5 + 3H_2C_2O_4 \rightarrow 2VOC_2O_4 + H_2O + 2CO_2 \quad (1)$$

$$2VOC_2O_4 + 2LiF + 2NH_4H_2PO_4 \rightarrow \quad (2)$$
$$2LiVPO_4F + CO + 3CO_2 + 2NH_3 + 3H_2O$$

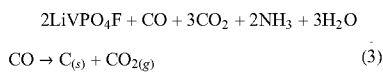
$$CO \rightarrow C_{(s)} + CO_{2(g)} \quad (3)$$

A mixture of colloids, PTFE (avg. 180 nm) and PMMA (avg. 30-50 nm), were used as the polymer template and later mixed with the sol to create high surface area c-nLVPF. In order to keep the PMMA colloids suspended throughout the gelation process to form a well-ordered (uniform or substantially uniform) porous network, small amount of the surfactant Pluronic F127 ($(EO)_{98}(PO)_{67}(EO)_{98}$) was added to the solution to improve their stability. As a nonionic surfactant, Pluronic F127 can interact with the ammonium lauryl sulfate (ALS) stabilizing the PMMA colloids to increase the solubility of PMMA colloids as the concentration of the sol increases during the gelling process. Very small PMMA colloids can be readily synthesized, and these colloids are thus key to the high surface area and short diffusion path lengths needed for fast charging and discharging. Unlike the PMMA, which can crash out of solution without stabilization at high concentration, the PTFE colloids can readily be dispersed in solution and stay stably suspended in the acidic sol even at high concentrations. PTFE colloids are necessary to the synthesis as they serve as both the polymer template and the fluorine source for creating a fluorine-rich environment. Very small LVPF colloids are not readily available, however, and so the combination of colloidal PTFE and colloidal PMMA is required to produce appropriately small nanostructures.

Moreover, we note that while the fluorine rich environment created by the decomposition of PTFE is required to produce the fluorophosphate, rather than the related oxophosphate, it can also have detrimental effects, and so phase pure, high porosity materials cannot be made using PTFE colloids alone, even if small colloids could be produced. During calcination, fluorine can react with the $H_2O$ generated from combustion of the polymer template to form HF. $VF_3$ gas can also be generated if LVPF is calcine for an extended period of time. Both of these reaction routes are described in Equations (4) and (5) and result in impurity phases such as $Li_3V_2(PO_4)_3$ and $V_2O_3$.

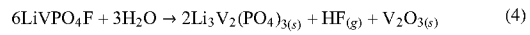
$$6LiVPO_4F + 3H_2O \rightarrow 2Li_3V_2(PO_4)_{3(s)} + HF_{(g)} + V_2O_{3(s)} \quad (4)$$

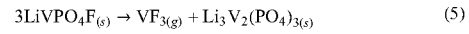
$$3LiVPO_4F_{(s)} \rightarrow VF_{3(g)} + Li_3V_2(PO_4)_{3(s)} \quad (5)$$

The crystal structure of c-nLVPF made with an optimal combination of PTFE and PMMA colloids was verified by X-ray diffraction. The diffraction pattern of c-nLVPF (FIG. 1) agrees well with the typical favorite structure with a triclinic unit cell (space group P-1, JCPDS No. 42-1412) and the lattice constants calculated via Rietveld refinement from this data also matches well with others reported in the literature (Table 1). Traces of $Li_3V_2(PO_4)_3$ impurity were found in c-nLVPF due to the high temperature calcination process and combustion of polymer templates. The crystal structure of LVPF can be described as a 3-D framework consists of corner sharing polyhedrals of $VO_4F_2$ octahedra and $PO_4$ tetrahedra with open tunnels along the (100), (010), and (101) planes, making it a 1-D ionic conductor. The crystallite size calculated from the Scherrer equation is about 86 nm. With decreased crystallite size, the rate capabilities can potentially be further improved. However, there is an optimal crystallite size as the higher surface area of the particles can result in the formation of additional cathode electrolyte interphase (CEI) and an increase in the cell resistance.

The evenly distributed pores in c-nLVPF are shown in both low and high magnification scanning electron microscopy (SEM) images (FIG. 2A through FIG. 2C). These micron-sized nanoporous powders are made of interconnected pore walls 50-250 nm thick with pores roughly 20 to 100 nm in diameter. With its unique nanoporous morphology, both ion and electrolyte diffusion can be significantly improved across the active material, giving rise to the exceptional rate capabilities. The carbon coating of c-nLVPF can be seen in the transmission electron microscopy (TEM) images in FIG. 3A and FIG. 3B. The layer of amorphous carbon is approximately 5 nm thick, which agrees with other works using similar $V_2O_5$ to oxalic acid ratio. Thermal gravimetric analysis (FIG. 4) indicates that the c-nLVPF materials contains about 16% carbon, including both the oxalic acid derived carbon coating and any residual carbon from the polymer template. The carbon content is calculated using the mass loss from 375° C. to 575° C., which corresponds to the elimination of carbon to form $CO_2$. An additional weight loss of about 1.5% is attributed to the substitution of oxygen for fluorine in the c-nLVPF structure, which occurs within the same temperature range.

Nitrogen porosimetry was performed to calculate the total surface area and to measure the pore size distribution in c-nLVPF. The calculated surface area using the Brunauer-Emmett-Teller (BET) model is 21 $m^2/g$. The type II adsorption isotherm (FIG. 5) signifies the presence of both macro and nanopores from the large PTFE and small PMMA templates. The pore size distribution calculated from the Barrett-Joyner-Halenda region (<100 nm) is 10-80 nm, with mostly 10-30 nm pores as shown in FIG. 19 and FIG. 20. This pore size distribution measured from N2 porosimetry agrees well with the wide range of pore sizes observed in the SEM images. In addition, the fraction porosity of c-nLVPF, 15%, is also calculated from the bulk density and the single point pore volume.

1.2 Electrochemical Cycling

To investigate the redox processes and electrochemical performances of c-nLVPF, c-nLVPF electrodes were cycled in 2032 coin cells with glass fiber separators against lithium metal. The cyclic voltammogram (CV) and galvanostatic cycling (GV) curves were measured in 1M $LiClO_4$ in PC and 1.2M $LiPF_6$ in 2FEC:8DMC vol. %, receptively. The one electron process of c-nLVPF during charge and discharge relies on the $V^{3+}/V^{4+}$ redox couple. The electrochemical reaction is described below in Equation (6).

$$LiV^{III}PO_4F \rightarrow V^{IV}PO_4F + Li^+ + e^- \qquad (6)$$

A slow rate cyclic voltammagram measured at 0.1 mV/s from 3 to 4.5V vs. $Li/Li^+$ is shown in FIG. 6. The oxidation peaks at 4.27 V and 4.33 V correspond to the intermediate phase, $Li_{0.65}VPO_4F$, and the fully delithiated phase, $VPO_4F$, respectively. The broader peak at 4.33V in the first cycle can be attributed to CEI layer formation. During discharge, only one reduction peak is observed at 4.18 V as Li intercalates into $VPO_4F$ to reversibly form LVPF. This asymmetric redox pair suggests that different reaction pathways are taken upon lithiation and delithiation. Even though this phenomenon has been found in many other LVPF studies, it is not yet fully understood.

Regardless of these questions, the oxidation and reduction peaks obtained from the CV curves are well match to the plateaus in the charge and discharge profiles at 1 C (calculated from theoretical capacity) from 3V-4.6V (FIG. 7 and FIG. 8). A step function corresponding to the two oxidation peaks is observed during charge while a smooth plateau is found during discharge. The discharge capacity based on LVPF loading for the first cycle is 152 mAh/g, which is almost the total theoretical capacity (158 mAh/g) with 96% coulombic efficiency. The rate capabilities of these c-nLVPF are tested at C, 5 C, 10 C, 15 C, 20 C, and 30 C as shown in FIG. 9. Exceptional rate capabilities were demonstrated even up to 30 C with a discharge capacity of 110 mAh/g and almost 100% coulombic efficiency.

We note that these favorable results are made possible in part by a recent push to developing stable electrolytes for higher voltage lithium-ion cells in order to increase energy density. It has been demonstrated that by increasing the potential cutoff of the cathode from the typical 4.2 V to 4.5 V and even to 4.8V vs. $Li/Li^+$, 18% and 36% increase in energy density can be achieved. Unfortunately, most conventional carbonate solvents are only stable up to 4.2 V. However, with additives such as vinylene carbonate (VC) and fluoroethylene carbonate (FEC), the operating voltage window can be extended. In particular, FEC has been cycled up to 5V with very stable behaviors. To realize c-nLVPF's full capacity at its high redox potentials and faster rates, electrolyte consists of fluoroethylene carbonate (FEC) and dimethyl carbonate (DMC) were used in this study. The c-nLVPF cycled in 1M $LiClO_4$ in PC does not show such fast rate capability as shown in FIG. 21 through FIG. 23. This drastic difference in performance can be attributed to the different types of CEI formed on the surfaces of c-nLVPF in PC, compared to FEC/DMC. It is known that the process of FEC decomposition results in highly-effective, compact surface thin films consist of mainly PEO-like polymer and $MCO_3$ species. Meanwhile, thick and irregular CEI layers are typically formed from conventional carbonate electrolytes with mostly organic carbonates/polycarbonate moieties. With FEC forming a compact thin passivating layer to prevent further electron transfer, the electrical resistance is significantly reduced and the stability and reversibility are also improved. Even after cycling at 20 C for 2000 cycles, 115 mAh/g capacity was retained with only 9% capacity fade (FIG. 10).

1.3 Charge Storage Mechanism and Operando X-ray Diffraction Study

Nanostructured materials are attractive compared to bulk materials because interesting phenomenon can occur at the nanoscale. It has been previously shown that when battery materials such as $TiS_2$, $TiO_2$, $MoO_2$, $MoS_2$, $LiMn_2O_4$ are nanostructured, the phase transition between Li-rich and Li-poor phases can be suppressed and the charge storage mechanism can change from a diffusion controlled, battery-like process to capacitive behavior. Such materials are classified as intercalation pseudocapacitors rather than batteries. This phenomenon, however, does not always occur. As we show below, certain materials, including LVPF, do not exhibit this crossover from a battery-like behavior to pseudocapacitance, even when nanostructured. To understand the charge storage mechanism of our c-nLVPF, the current response as a function of scan rate in a cyclic voltammetry measurement can be used to distinguish between a capacitor-like or diffusion controlled charge storage mechanism according to the following equation:

$$i = av^b \qquad (7)$$

where, i is the measured current, v is the scan rate, and a and b are both constants. Here the exponential term, b, distinguishes the charge storage mechanism: when b is equal to 0.5 (i.e. when the current i is proportional to scan rate $v^{1/2}$), the current is dominantly governed by diffusion. When b equals 1 (i directly proportional to v), it indicates a capacitor-like behavior, where the current is not diffusion controlled, a situation that arises for surface pseudocapacitive reactions or when intercalation reaction kinetics are capacitive in nature due to the suppression in phase transitions. According to our analysis (FIG. 11) in 1M $LiClO_4$ in PC, the b values of c-nLVPF at all peak currents are close to 0.5 (0.55 and 0.54 for the cathodic peaks and 0.55 for the anodic peak), indicating a diffusion controlled charge storage mechanism that resembles a typical battery material.

To confirm this, any phase transitions in c-nLVPF that occur during charge and discharge were investigated using operando X-ray diffraction at Stanford Synchrotron Radiation Lightsource (SSRL) using beam line 11-3. c-nLVPF electrodes were cycled in 1.2M $LiPF_6$ in 2FEC:8DMC vol. % in 2032 coin cells with Kapton window and glass fiber separators against lithium metal. Prior researchers have shown that micron-sized LVPF undergoes a first-order phase transition as Li deintercalates from LVPF to form $VPO_4F$. The same phase changes and peaks shifts are observed in our c-nLVPF. Diffraction peaks in two different Q regions, 1.26-1.38 $Å^{-1}$ and 1.8-2.15 $Å^{-1}$, are shown in FIG. 12. To guide the readers through all the peak shifts, diffraction profiles at OCV and the fully discharged states are shown as mixed long and short lines, patterns with two phase coexistence are shown as long dashed lines, and the short lines represent the fully charged state. As delithiation begins, the (010) and (100) doublet at 1.28 $Å^{-1}$ and 1.31 $Å^{-1}$ shifts to higher Q. This results in a new set of doublet, representing the $VPO_4F$ phase at 1.32 and 1.34 $Å^{-1}$ at the end of charge. During discharge (lithiation), the doublet shifts back to its original position at OCV (1.28 and 1.31 $Å^{-1}$), indicating the reversibility of this phase transition. The same trend is observed at higher Q. The (−111) and (0-11) peaks at 1.8 $Å^{-1}$ and 1.9 $Å^{-1}$ shifts to slightly higher Q and merges into a new peak at 1.91 $Å^{-1}$ during discharge while (1-10) shifts to lower Q and splits into a doublet at 2.02 and 2.04 $Å^{-1}$. Again, all of these new peaks match the established diffraction pattern of $VPO_4F$ and transform back to the original LVPF peak positions during discharge.

We believe that the fast charging capabilities of c-nLVPF are possible even when accompanied by a phase transition due to a combination of 1) the open 1-D conduction pathway in both the lithiated and delithiated structure, 2) the unique structure of this polyanionic cathodes with corner sharing polyhedral subunits comprised of covalent X—O bonds (X=S, P, Mo, etc.), and 3) a nanoporous structure with improved ion diffusion and shorten diffusion path lengths. LVPF is composed of corner sharing $VO_4F_2$ octahedra and $PO_4$ tetrahedra. The delithiated phase, monoclinic $VPO_4F$, is made of the same building blocks as the triclinic LVPF with the removal of Li ion in the 1-D conduction pathways. As the conduction pathways remain open throughout charge and discharge, the Li-ions can intercalate and deintercalate rapidly even in the presence of a phase transition. In addition, the activation energy for lithium diffusion in $VPO_4F$ is low (328 meV), which also contributes to the excellent rate capabilities. These corner sharing polydedral subunits not only build the 3-D network of the polyanionic cathodes, but also help preserve their structural integrity during repetitive phase changes. The corner sharing polyhedrals allow a concerted rotation of the subunits during the phase transition and allows much greater lattice flexibility than in layered or spinel oxides, where severe structural reconstructions are found. With its shortened diffusion path length, open 1-D tunnels (even at the delithiated state) and a 3-D framework that allow for polyhedral rotation during phase transitions (triclinic to monoclinic), c-nLVPF exhibits performances similar to a pseudocapacitor even though it is a battery.

1.4 Self-Discharge Study

To evaluate the surface stability of c-nLVPF, self-discharge studies were performed. The c-nLVPF half-cell in 1.2 M $LiPF_6$ 2FEC:8DMC vol. % was charged to 4.6V at 1 C, rested for 12 hr and discharged to 3V again at 1 C (FIG. 13 through FIG. 15). During the 12 hr rest, the open circuit voltage (OCV) drops from 4.6V to 4.25V, which is above the discharge plateau at 4.1V, allowing the c-nLVPF to retain a high discharge capacity. Almost 140 mAh/g was obtained on the first discharge with 92% coulombic efficiency. In the subsequence self-discharge cycles, the coulombic efficiencies improve while maintaining similar discharge capacity. This suggests c-nLVPF has a stable solid-liquid interface and no capacity fade is observed due to metal dissolution or other catalytic reaction. This can be attributed to the carbon coating and the stable CEI resulted from the FEC/DMC decomposition.

1.5 Full Cell Device

As a proof of concept for a fast charging device, c-nLVPF was paired with pseudocapacitive nanostructured $Nb_2O_5$ in a full cell. The half-cell charge and discharge curves of the respective electrodes can be found in FIG. 24. The CV of the overloaded $Nb_2O_5$ and c-nLVPF full cell (N/P ratio about 8.1, FIG. 24) cycled at 0.1 mV/s between 1.5V to 2.8V is shown in FIG. 16. The irreversible oxidation peaks on the first cycle can be attributed to CEI formation. In later cycles, oxidation peaks of c-nLVPF can be identified at 2.1V and 2.3V while the corresponding reduction peak is present at 2.05V. The broadening of the redox peaks and the sloping profiles observed in the galvanostatic cycling curves can be attributed to the $Nb_2O_5$ anode, as the cell voltage is no longer referenced to Li metal. FIG. 17 shows the first three galvanostatic cycling charge and discharge curves at 1 C. Since c-nLVPF is the limiting electrode, all capacity are normalized to the mass loading of the cathode. At 1 C, 200 mAh/g were obtained and at 30 C, 100 mAh/g were still achieved. The extra capacity observed in the full-cell may be attributed to a variety of factors, including the porosity of the LVPF and the lack of a reference electrode. Some extra capacity should arise from double layer capacitance in the porous electrode. In addition, due to the uncertainty of the respective electrode potentials upon full cell pairing, it is possible that $LiVPO_4F$ is pushed above 4.5 V vs. Li when the full cell is cycled to 2.5 V. This should allow for additional double layer capacitance and potentially some surface redox pseudocapacitance at these higher voltages. We note that since the anode is overloaded, it will not limit any of these mechanisms. This fast charging capability of the full cell is demonstrated in FIG. 18, which shows good capacity retention at rates up to 30 C.

2. Conclusion

We have thus described a facile synthesis for c-nLVPF using colloidal PTFE and PMMA as polymer templates. By deviating from the traditional electrolytes that begin to decompose at 4.2V, the operating voltage window can be extended to 4.6V, enabling fast charging with excellent stability. This fast charging behavior can be attributed to three key factors: 1) the short diffusion distances in c-nLVPF attained through nanostructuring, 2) the open tunnels on both LVPF and $VPO_4F$ that allows fast ion diffusion, and 3) the thin and compact CEI resulted from FEC/DMC decomposition. Together, these factors allow for high capacities even at 30 C. Interestingly, despite this excellent rate capability, c-nLVPF remains fundamentally a battery and does not show pseudocapacitive behavior. It shows a standard first order phase transition upon lithiation and diffusion controlled lithium intercalation/deintercalation kinetics. Despite this fact, the c-nLVPF can be effectively paired with a pseudocapacitive anodes to produce a high rate energy-storage system. Overall, we have demonstrated both a facile synthetic route to the formation of c-nLVPF, and demonstrated this materials promise as a cathode for high-energy, fast-charging application.

3. Experimental Procedures

3.1 Synthesis c-nLVPF can be made through a water based sol-gel polymer templating synthesis. 1:4 stoichiometric amount of $V_2O_5$ (Sigma Aldrich) and oxalic acid (Sigma Adrich) was first dissolved in 10 mL of water at 70° C. and stirred for an hour to obtain a blue solution. After the solution had cooled down to room temperature, the other precursors, 1:2 stoichiometric amounts of $NH_4H_2PO_4$ (Alfa Aesar) and LiF (Alfa Aesar), were added and stirred for another few hours. Excess LiF was added to compensate for lithium and fluorine lost during calcination. The 10 mL solution was then heated at 100° C. and reduced to 2 mL, followed by the addition of 0.3 mL PTFE colloids (Chemours, DISP 30) to the sol. Meanwhile, a separate solution of 1 mL colloidal PMMA colloidal (150 mg/mL) with 12.5 mg of Pluronic $F_{127}$ was made. The synthesis of the PMMA colloidal suspension is included in a later paragraph. Last but not least, the PTFE solution with all the precursors was added dropwise to the PMMA/Pluronic F127 solution. The final mixture was then dried overnight in a petri-dish to obtain a gel. To crystallize the c-nLVPF, the gel was dried in the vacuum oven at 100° C. prior calcination to get rid of the water in the gel. The dried gel was then transferred to an alumina boat and heated at 700° C. for 2 hr under Ar. After heat treatment, the final product, c-nLVPF (dark gray powder) was obtained.

The synthesis of PMMA colloidal solution is adapted from previous literature. Ammonium persulfate (APS) was used as the initiator and ammonium lauryl sulfate (ALS) as the surfactant. 0.08 g APS, 2.29 mL ALS and 84 mL deionized water were put in a three-neck round-bottom flask (250 mL) equipped with magnetic stirrer, reflux condenser, and thermometer. The temperature was raised to 75° C., and 14 mL of monomer, methyl methacrylate, was added in a differential manner (continuously addition in very small drops) using a syringe pump for about 1 hr. After addition, the reaction temperature was held at 80 to 85° C. for an additional hour before a cooling to room temperature.

3.2 Characterization

Powder X-ray diffraction (XRD) was performed on a D8 diffractometer (Bruker) operating with Cu Kα radiation ($\lambda$=1.5418 Å) with a voltage of 45 kV, and a current of 40 mA. XRD patterns were recorded in the range of 10°<2θ<80° using a 0.03° step size. Lattice parameters were obtained by Rietveld refinement of this data using the software package MAUD (version 2.78). Scanning electron microscopy (SEM) images were obtained using a model JEOL JSM-6700 F field emission electron microscope with 3 kV accelerating voltage and secondary electron detector configuration. Transmission electron microscopy (TEM) was performed using a FEI Technai TF20 operating at 200 kV. Nitrogen porosimetry was carried out using a Micromeritics TriStar II 3020. The surface area was calculated from the adsorption branch of the isotherm (between 0.04-0.30 P/Po) using the Brunauer-Emmett-Teller (BET) model. The pore diameter and pore volume were also calculated from the adsorption branch of the isotherm using the Barret-Joyner-Halenda (BJH) model. Thermal gravimetric analysis (TGA) was performed on a Perkin Elmer Pyris Diamond TGA/DTA. The sample was heated to 50° C. and held for 1 min then ramped up to 575° C. with a 20° C./min ramp rate and held for 1 hr.

3.3 Electrochemistry

Carbon based electrodes with 70 wt. % c-nLVPF, 5 wt. % vapor grown carbon fibers (Sigma Aldrich), 5 wt. % multi-wall carbon nanotube (Sigma Alrich), and 10 wt. % Poly (vinylidene fluoride) ($M_w$=250K, Sigma Aldrich) were used for all electrochemical testing. Active material, carbon and binder were mixed in a mortar for 10 min until a consistent honey-like slurry was obtained. The slurry was then cast onto an Al current collector and dried at 120° C. in a vacuum oven overnight. A disk ⅜ inch in diameter was then punched out from the electrode for electrochemical testing. All cycling was performed in 2032 coin cells with glass fiber (Advantec) separators using VSP-100 Biologic. During half-cell testing, c-nLVPF electrodes with (1 mg/cm$^2$) were cycled in 1.2M $LiPF_6$ (Oakwood Inc.) in FEC (Alfa Aesar)/DMC (Sigma Aldrich) (20/80 vol. %) against lithium metal. The one exception is the CV measurement (including b-value analysis) collected using 1M $LiClO_4$ (Sigma Aldrich) in PC (Sigma Aldrich).

In the full cell device, 1 mg/cm$_2$ c-nLVPF electrode was paired with 10 mg/cm$_2$ $Nb_2O_5$ electrodes (gifted by Battery Streak Inc.) and cycled in 1M $LiClO_4$ in PC. The operating voltage window was determined by both CV and half-cell testing.

3.4 Operando X-ray Diffraction Study

Coin cells with 3 mm holes and Kapton tape window was used for the operando study. The Kapton tape window was chosen for X-ray transparency. The coin cells were stored in an Ar atmosphere until cycling was performed to prevent exposure. Due to time constraints, all cycling was performed at 1 C for the operando studies at SSRL beamline 11-3 at an X-ray energy of 12300 eV. Operando data was collected using a MAR 345 Image Plate with 130 mm work distance. Data was collected from Q=0 to 4.5 Å-1. The electrode and electrolyte formulations used here are the same as all previous half-cell GV testing. All diffraction intensity data is plotted as a function of the scattering vector length $$Q = \frac{4\pi}{\lambda}\sin(\theta),$$

where θ is nail or the scattering angle and λ is the wavelength of the incident radiation; the d-spacing thus is simply $$\frac{2\pi}{Q}.$$

All diffraction peaks were normalized to the Al peak using Area Diffraction Machine. Backgrounds subtraction of all spectra were later performed in Origin. Diffraction of a blank cell (a regular coin cell with Kapton window containing all components except the active material) was used to generate the background diffraction pattern.

FIG. 19 through FIG. 23 provide additional results on the pore size distribution of c-nLVPF and its electrochemical performance in conventional electrolyte (1 M $LiClO_4$ in PC). FIG. 19 shows dV/d log(w) (volume-weighted) pore size distribution of c-nLVPF calculated from the Barrett-Joyner-Halenda region. FIG. 20 shows dV/dw (number-weighted) pore size distribution of c-nLVPF calculated from the Barrett-Joyner-Halenda region. c-nLVPF has a large pore size distribution from 10-80 nm but consists of mostly 10-30 nm pores. FIG. 21 shows the first three charge and discharge profiles of c-nLVPF in 1M LiClO$_4$ in PC at 1 C. Half-cell testing in 1M LiClO$_4$ in PC was cycled from 3 to 4.5V instead of 3 to 4.6V because conventional carbonate electrolytes are not stable beyond 4.6V voltage. They begin experiencing breakdown at 4.2V. FIG. 22 shows charge and discharge curves of c-nLVPF in 1M LiClO$_4$ in PC at 0.2 C, C, 5 C, 10 C, 15 C, and 20 C. FIG. 23 shows rate capability of c-nLVPF in two different electrolytes, 1M LiPF$_6$ in FEC/DMC (dots) and 1M LiClO$_4$ in PC (boxes). The discharge capacities are comparable at slow rate but at faster rates, c-nLVPF performs much better in 1M LiPF$_6$ FEC/DMC. FIG. 24 shows charge and discharge curves of c-nLVPF (upper traces) and Nb$_2$O$_5$ (lower traces) used in full cell testing. The area of the c-nLVPF and Nb$_2$O$_5$ electrodes are 0.7 cm$^2$ and 1.26 cm$^2$, respectively. These galvanostatic curves were obtained from half-cell testing in 1M LiClO$_4$ in PC at 1 C.

4. Applications and Variations

Those skilled in the art will readily appreciate that the technology presented above may provide foundational components to lithium ion cells and batteries and devices powered by lithium ion batteries. It will also be appreciated that materials are not limited to those presented and that different materials can be used as appropriate. Those skilled in the art will further appreciate that the processing steps are not limited to those presented. Accordingly, various examples are provided below without intending to limit the scope of the technology.

For example, the c-nLVPF described herein can be used in a battery as an element of a nanostructured, nanoporous electrode. Such an electrode may comprise for example: (a) an electrically conductive substrate; (b) nLVPF comprising a metal fluorophosphate and mixtures of one or more metal fluorophosphates in the form A$_z$B$_x$PO$_4$F$_y$ or A$_z$B$_x$C$_r$PO$_4$F$_y$, where A, B, C are metals or mixtures thereof and where $0<x\leq1$, $0\leq z\leq1$, $0\leq y\leq1$, and $0\leq r\leq1$; (c) a surface coating of a nanoscale conductive material on the nLVPF that forms coated nLVFP (c-nLVPF); and (d) a conducting material in contact with the electrically conductive substrate and the c-nLVPF. In this example, metal A may comprise a metal selected from the group consisting of lithium (Li), sodium (Na), potassium (K), and magnesium (Mg), or a combination thereof. Metal B may comprise a metal selected from the group consisting of chromium (Cr), iridium (Ir), molybdenum (Mo), niobium (Nb), ruthenium (Ru), titanium (Ti), manganese (Mn), iron (Fe), nickel (Ni), vanadium (V), copper (Cu), zinc (Zn), cobalt (Co), aluminum (Al), and tungsten (W), or a combination thereof. Metal C may comprise a metal selected from the group consisting of chromium (Cr), iridium (Ir), molybdenum (Mo), niobium (Nb), ruthenium (Ru), titanium (Ti), manganese (Mn), iron (Fe), nickel (Ni), vanadium (V), copper (Cu), zinc (Zn), cobalt (Co), aluminum (Al), and tungsten (W), or a combination thereof.

As described previously, the c-nLVPF is nanoporous and has a plurality of pores defined by nanocrystalline walls. The wall size can vary but is typically in the range of about 10 nm to about 500 nm thick with pore size in the range of about 10 nm to about 500 nm in diameter. The surface coating of nanoscale conductive material may form the same porosity with the nLVPF and may comprise carbon having a thickness typically in the range of about 2 nm to about 50 nm or thicker.

The conducting material may, for example, comprise a material selected from the group consisting of carbon blacks, graphene, graphene oxide (GO), reduced graphene oxide (rGO), carbon nanotubes, and carbon nanofibers, or a combination thereof.

The nanoscale conductive surface coating may, for example, comprise a material selected from the group consisting of carbon blacks, graphene, graphene oxide (GO), reduced graphene oxide (rGO), carbon nanotubes, and carbon nanofibers, metal nanowires, metal nanoparticles, and metal nanofibers, or a combination thereof.

A binder, such as a polymeric binder, may be used to provide adhesion between the active particles and the current collector. The polymeric binder may, for example, comprise a material selected from the group consisting of styrene butadiene rubber (SBR), carboxymethyl cellulose (CMC), polyvinylidene fluoride (PVDF), poly tetrafluoro ethylene (PTFE), Nafion, polyacrylonitrile (PAN), polyethylene oxide (PEO), polyvinyl alcohol (PVA), polyacrylic acid (PAA) or a combination thereof.

The c-nLVPF may be placed between layers of graphene or reduced chemically-derived graphene oxide (rGO) to form an assembly.

As described above, the metal fluorophosphate used in the electrode may comprise various metals. In one embodiment, the metal fluorophosphate comprises lithium vanadium fluorophosphate (LVPF) with a composition comprising Li$_z$VPO$_4$F$_y$ and comprising an interconnected pore structure with pore walls of about 10 nm to about 500 nm thick and pores of about 10 nm to about 500 nm in diameter with a carbon coating of about 2 nm to about 50 nm thick.

It will also be appreciated that any of the electrode configurations described above can be used as a positive electrode (cathode) in a battery such as a lithium ion battery. The lithium ion battery may comprise the positive electrode coupled with a lithium ion electrolyte and a negative electrode. The lithium ion electrolyte may comprise, for example, a lithium salt dissolved in either an aqueous solvent, a non-aqueous solvent or an ionic liquid. The lithium ion electrolyte may comprise, for example, a ceramic, gel polymer or solid polymer electrolyte consisting of a lithium salt acting as a solid state lithium ion conductor. The negative electrode may, for example, comprise a material selected from the group consisting of carbon, activated carbon, graphene, lithium titanium oxide, lithium metal, lithium metal alloys, niobium oxide, mixed metal oxides, silicon, and silicon oxide, or a combination thereof. The positive electrode material may acts as a fast lithium ion conductor resulting in high rate performance during both lithiation and delithiation.

Methods for fabricating the foregoing materials have also been described. Succinctly, one example comprises a multistep process comprising synthesizing the nanoporous metal fluorophosphate material using a solution phase process followed by coating the nanoporous metal fluorophosphate material with nanoscale coating material to form the c-nLVFP. Another example comprises a single-step wetchemical method where reaction parameters such as temperature, pressure and pH of the reaction are controlled to obtain the desired structure. These methods may also include creating a template that is later removed to form the pores. Thus, the pores may have a uniform or substantially uniform interconnected structure separated by walls.

From the description herein, it will be appreciated that that the present disclosure encompasses multiple embodiments which include, but are not limited to, those described above as well as the following, and any combination thereof:

1. A cathode material for lithium ion batteries, the material comprising: carbon coated nanoporous lithium vanadium fluorophosphate (c-nLVPF).
2. A cathode material for lithium ion batteries, the material comprising: carbon coated nanoporous lithium vanadium fluorophosphate (c-nLVPF) having a templated pore structure.
3. A cathode material for lithium ion batteries, the material comprising: carbon coated nanoporous lithium vanadium fluorophosphate (c-nLVPF) having a substantially uniform pore structure.
4. A cathode material for lithium ion batteries, the material comprising: carbon coated nanoporous lithium vanadium fluorophosphate (c-nLVPF) having a substantially uniform templated pore structure.
5. The material of any following or preceding embodiment, wherein the material can be stably cycled up to about 4.6V in standard $LiPF_6$ electrolytes.
6. The material of any following or preceding embodiment, wherein the material exhibits little self-discharge, an open circuit voltage of about 4.2 V, and a discharge capacity of about 139 mAh/g obtained after holding for about 12 hours.
7. The electrode, cathode material, method or improvement of any following or preceding embodiment, wherein the pore structure comprises: interconnected pore walls having a thickness from about 10 nm to about 500 nm; and pores having a diameter from about 10 nm to about 500 nm.
8. The electrode, cathode material, method or improvement of any following or preceding embodiment, wherein the pore structure comprises: interconnected pore walls having a thickness from about 10 nm to about 500 nm; and pores having a diameter from about 10 nm to about 500 nm.
9. The electrode, cathode material, method or improvement of any following or preceding embodiment, wherein the pore structure comprises interconnected pore walls having a carbon coating with a thickness from about 2 nm to 200 nm.
10. The electrode, cathode material, method or improvement of any following or preceding embodiment, wherein the pore structure comprises interconnected pore walls having a carbon coating with a thickness of about 5 nm.
11. The electrode, cathode material, method or improvement of any following or preceding embodiment, wherein the pore structure is formed using a fluoropolymer as a template material.
12. The electrode, cathode material, method or improvement of any following or preceding embodiment, wherein the fluoropolymer comprises polytetrafluoroethylene (PTFE).
13. The electrode, cathode material, method or improvement of any following or preceding embodiment, wherein the material is synthesized using a combination of a fluoropolymer and polymethyl methacrylate (PMMA) colloids that provide a fluorine source, an oxygen scavenger, and a template material for forming the pore structure in the material.
14. The electrode, cathode material, method or improvement of any following or preceding embodiment, wherein the material exhibits diffusion controlled charge storage.
15. The electrode, cathode material, method or improvement of any following or preceding embodiment, wherein a phase transition occurs in the material during charge and discharge.
16. The electrode, cathode material, method or improvement of any preceding embodiment, wherein the material is a component of a $Nb_2O_5$|c-nLVPF cell.
17. A method of forming a cathode material for lithium ion batteries, the method comprising: using a combination of fluoropolymer and polymethyl methacrylate (PMMA) colloids as a fluorine source, an oxygen scavenger, and polymer material during synthesis of carbon coated nanoporous lithium vanadium fluorophosphate (c-nLVPF), wherein the c-nLVPF has a pore structure templated by the polymer material.
18. A method of forming a cathode material for lithium ion batteries, the method comprising: (a) synthesizing carbon coated nanoporous lithium vanadium fluorophosphate (c-nLVPF) from: (i) $V_2O_5$, (ii) $NH_4H_2PO_4$ and LiF precursors, and (iii) fluoropolymer and polymethyl methacrylate (PMMA) colloids as a fluorine source, an oxygen scavenger, and polymer material; (b) wherein the c-nLVPF has a pore structure templated by the polymer material.
19. An improved method of synthesizing carbon coated nanoporous lithium vanadium fluorophosphate (c-nLVPF), the improvement comprising: using a combination of fluoropolymer and polymethyl methacrylate (PMMA) colloids as a fluorine source, an oxygen scavenger, and polymer material, wherein the c-nLVPF has a pore structure templated by the polymer material.
20. A cathode material for lithium ion batteries, the material comprising: (a) nanoporous lithium vanadium fluorophosphate (nLVPF) comprising a metal fluorophosphate and mixtures of one or more metal fluorophosphates in the form $A_zB_xPO_4F_y$ or $A_zB_xCrPO_4F_y$ where A, B, C are metals or mixtures thereof and where 0<x<1, 0<z<1, 0<y<1, and 0<r<1; and (b) a surface coating of nanoscale conductive material on the nLVPF that forms coated nLVPF (c-nLVPF); (c) wherein metal A comprises a metal selected from the group consisting of lithium (Li), sodium (Na), potassium (K), and magnesium (Mg), or a combination thereof; (d) wherein metal B comprises a metal selected from the group consisting of chromium (Cr), iridium (Ir), molybdenum (Mo), niobium (Nb), ruthenium (Ru), titanium (Ti), manganese (Mn), iron (Fe), nickel (Ni), vanadium (V), copper (Cu), zinc (Zn), cobalt (Co), aluminum (Al), and tungsten (W), or a combination thereof; and (e) wherein metal C comprises a metal selected from the group consisting of chromium (Cr), iridium (Ir), molybdenum (Mo), niobium (Nb), ruthenium (Ru), titanium (Ti), manganese (Mn), iron (Fe), nickel (Ni), vanadium (V), copper (Cu), zinc (Zn), cobalt (Co), aluminum (Al), and tungsten (W), or a combination thereof.
21. A nanostructured, nanoporous electrode, comprising: (a) an electrically conductive substrate; (b) nanoporous lithium vanadium fluorophosphate (nLVPF) comprising a metal fluorophosphate and mixtures of one or more metal fluorophosphates in the form $A_zB_xPO_4F_y$ or $A_zB_xCrPO_4F_y$ where A, B, C are metals or mixtures thereof and where 0<x<1, 0<z<1, 0<y<1, and 0<r<1; (c) a surface coating of nanoscale conductive material on the nLVPF that forms coated nLVPF (c-nLVPF); and (d) a conducting material in contact with the electrically conductive substrate and the c-nLVPF; (e)

wherein metal A comprises a metal selected from the group consisting of lithium (Li), sodium (Na), potassium (K), and magnesium (Mg), or a combination thereof; (f) wherein metal B comprises a metal selected from the group consisting of chromium (Cr), iridium (Ir), molybdenum (Mo), niobium (Nb), ruthenium (Ru), titanium (Ti), manganese (Mn), iron (Fe), nickel (Ni), vanadium (V), copper (Cu), zinc (Zn), cobalt (Co), aluminum (Al), and tungsten (W), or a combination thereof; and (g) wherein metal C comprises a metal selected from the group consisting of chromium (Cr), iridium (Ir), molybdenum (Mo), niobium (Nb), ruthenium (Ru), titanium (Ti), manganese (Mn), iron (Fe), nickel (Ni), vanadium (V), copper (Cu), zinc (Zn), cobalt (Co), aluminum (Al), and tungsten (W), or a combination thereof.

22. The electrode, cathode material, method or improvement of any preceding or following embodiment: wherein the c-nLVPF is nanoporous and has a plurality of pores defined by nanocrystalline walls; wherein wall size is in the range of about 10 nm to about 500 nm thick; and wherein pore size in the range of about 10 nm to about 500 nm in diameter.

23. The electrode, cathode material, method or improvement of any preceding of following embodiment, wherein the surface coating of nanoscale conductive material forms the same porosity with the nLVPF.

24. The electrode, cathode material, method or improvement of any preceding or following embodiment, wherein the surface coating of nanoscale conductive material has a thickness in the range of about 2 nm to about 50 nm or thicker.

25. The electrode, cathode material, method or improvement of any preceding for following embodiment, wherein the conducting material comprises a material selected from the group consisting of carbon blacks, graphene, graphene oxide (GO), reduced graphene oxide (rGO), carbon nanotubes, and carbon nanofibers, or a combination thereof.

26. The electrode, cathode material, method or improvement of any preceding or following embodiment, wherein the surface coating of nanoscale conductive material comprises a material selected from the group consisting of carbon, carbon blacks, graphene, graphene oxide (GO), reduced graphene oxide (rGO), carbon nanotubes, and carbon nanofibers, metal nanowires, metal nanoparticles, and metal nanofibers, or a combination thereof.

27. The electrode, cathode material, method or improvement of any preceding or following embodiment, wherein the electrode or cathode material comprises a positive electrode in a lithium ion battery, the lithium ion battery comprising the positive electrode coupled with a lithium ion electrolyte and a negative electrode.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

As used herein, the terms "approximately", "approximate", "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Lattice constants of as synthesized c-nLVPF and literature values of LVPF

| Lattice constant | As-synthesized c-nLVPF | Bulk LVPF |
|---|---|---|
| a | 5.3098 Å | 5.30941 Å |
| b | 7.5123 Å | 7.49936 Å |
| c | 5.1773 Å | 5.16888 Å |
| α | 112.99° | 112.933° |
| β | 81.60° | 81.664° |
| γ | 113.20° | 113.125° |

What is claimed is:

1. A cathode material for lithium ion batteries, the cathode material comprising:
   carbon coated nanoporous lithium vanadium fluorophosphate (c-nLVPF) having a templated pore structure;
   wherein the cathode material is synthesized using a combination of a fluoropolymer and polymethyl methacrylate (PMMA) colloids that provide a fluorine source, an oxygen scavenger, and a template material for forming the pore structure in the cathode material.

2. A cathode material for lithium ion batteries, the cathode material comprising:
   carbon coated nanoporous lithium vanadium fluorophosphate (c-nLVPF) having a substantially uniform pore structure;
   wherein the cathode material is synthesized using a combination of a fluoropolymer and polymethyl methacrylate (PMMA) colloids that provide a fluorine source, an oxygen scavenger, and a template material for forming the pore structure in the cathode material.

3. A cathode material for lithium ion batteries, the cathode material comprising:
   carbon coated nanoporous lithium vanadium fluorophosphate (c-nLVPF) having a substantially uniform templated pore structure;
   wherein the cathode material is synthesized using a combination of a fluoropolymer and polymethyl methacrylate (PMMA) colloids that provide a fluorine source, an oxygen scavenger, and a template material for forming the pore structure in the cathode material.

4. The cathode material of any of claims 1 through 3, wherein the pore structure comprises:
   interconnected pore walls having a thickness from about 10 nm to about 500 nm; and
   pores having a diameter from about 10 nm to about 500 nm.

5. The cathode material of any of claims 1 through 3, wherein the pore structure comprises interconnected pore walls having a carbon coating with a thickness from about 2 nm to 200 nm.

6. The cathode material of any of claims 1 through 3, wherein the pore structure comprises interconnected pore walls having a carbon coating with a thickness of about 5 nm.

7. The cathode material of any of claims 1 through 3, wherein the pore structure is formed using a fluoropolymer as a template material.

8. The cathode material of claim 7, wherein the fluoropolymer comprises polytetrafluoroethylene (PTFE).

9. The cathode material of any of claims 1 through 3, wherein the fluoropolymer comprises polytetrafluoroethylene (PTFE).

10. The cathode material of any of claims 1 through 3, wherein the cathode material exhibits diffusion controlled charge storage.

11. The cathode material of claim 10, wherein a phase transition occurs in the cathode material during charge and discharge.

12. The cathode material of any of claims 1 through 3, wherein the cathode material is a component of a $Nb_2O_5$|c-nLVPF cell.

* * * * *